United States Patent
Yuan et al.

(10) Patent No.: US 11,721,888 B2
(45) Date of Patent: Aug. 8, 2023

(54) ANTENNA COVER INCLUDING A POLYMER COMPOSITION HAVING A LOW DIELECTRIC CONSTANT AND DISSIPATION FACTOR

(71) Applicant: Ticona LLC, Florence, KY (US)

(72) Inventors: Xiang Yuan, Shanghai (CN); Young Shin Kim, Cincinnati, OH (US); Xiao Xun Xie, Shanghai (CN)

(73) Assignee: Ticona LLC, Florence, KY (US)

( * ) Notice: Subject to any disclaimer, the term of this patent is extended or adjusted under 35 U.S.C. 154(b) by 319 days.

(21) Appl. No.: 16/995,882

(22) Filed: Aug. 18, 2020

(65) Prior Publication Data

US 2021/0143539 A1    May 13, 2021

Related U.S. Application Data

(60) Provisional application No. 62/933,563, filed on Nov. 11, 2019.

(51) Int. Cl.
*H01Q 1/42* (2006.01)
*H01Q 1/38* (2006.01)
*H01Q 1/24* (2006.01)

(52) U.S. Cl.
CPC ............. *H01Q 1/422* (2013.01); *H01Q 1/246* (2013.01); *H01Q 1/38* (2013.01); *H01Q 1/425* (2013.01)

(58) Field of Classification Search
CPC ............. H01Q 1/422; H01Q 1/24; H01Q 1/38
See application file for complete search history.

(56) References Cited

U.S. PATENT DOCUMENTS

| | | | |
|---|---|---|---|
| 4,162,466 | A | 7/1979 | Hunsinger et al. |
| 4,458,039 | A | 7/1984 | Eickman |
| 4,746,694 | A | 5/1988 | Charbonneau et al. |
| 4,960,654 | A | 10/1990 | Yoshinaka et al. |
| 5,032,627 | A | 7/1991 | Wilson et al. |
| 5,348,990 | A | 9/1994 | Walpita et al. |

(Continued)

FOREIGN PATENT DOCUMENTS

| | | |
|---|---|---|
| CN | 104961916 A | 10/2015 |
| CN | 104961922 A | 10/2015 |

(Continued)

OTHER PUBLICATIONS

Young Shin Kim, U.S. Appl. No. 17/178,318, filed Feb. 18, 2021, Polymer Composition for Use in an Antenna System.

(Continued)

*Primary Examiner* — Andrea Lindgren Baltzell
(74) *Attorney, Agent, or Firm* — Dority & Manning, P.A.

(57) ABSTRACT

The present disclosure is directed to an antenna cover comprising a layer including a polymer composition. The polymer composition comprises a polymer matrix containing at least one polymer having a glass transition temperature of about 50° C. or more wherein the polymer matrix constitutes from about 30 wt. % to about 90 wt. % of the polymer composition. The polymer composition exhibits a dielectric constant of about 4 or less and a dissipation factor of about 0.02 or less, as determined at a frequency of 2 GHz. The present disclosure is also directed to a 5G radio frequency communication device and a base station including the aforementioned antenna cover.

39 Claims, 4 Drawing Sheets

(56) References Cited

U.S. PATENT DOCUMENTS

| | | |
|---|---|---|
| 5,541,240 A | 7/1996 | Makhija et al. |
| 5,624,984 A | 4/1997 | Furuta et al. |
| 5,767,195 A | 6/1998 | Furuta et al. |
| 6,121,369 A | 9/2000 | Stack et al. |
| 6,303,524 B1 | 10/2001 | Sharangpani et al. |
| 6,346,864 B1 | 2/2002 | Kadota |
| 6,350,822 B1 | 2/2002 | Van Diepen et al. |
| 6,495,616 B2 | 12/2002 | Maeda |
| 6,641,928 B2 | 11/2003 | Takeichi et al. |
| 6,756,427 B2 | 6/2004 | Maeda |
| 6,818,821 B2 | 11/2004 | Fujieda et al. |
| 7,079,405 B2 | 7/2006 | Tobita et al. |
| 7,180,172 B2 | 2/2007 | Sethumadhaven et al. |
| 7,223,807 B2 | 5/2007 | Okamoto et al. |
| 7,239,261 B2 | 7/2007 | Fujieda et al. |
| 7,247,590 B2 | 7/2007 | Kawabata et al. |
| 7,314,898 B2 | 1/2008 | Downing, Jr. et al. |
| 7,455,901 B2 | 11/2008 | Yano et al. |
| 7,504,150 B2 | 3/2009 | Lee et al. |
| 7,531,204 B2 | 5/2009 | Lee et al. |
| 7,547,849 B2 | 6/2009 | Lee et al. |
| 7,583,226 B2 | 9/2009 | Sakurada |
| 7,618,553 B2 | 11/2009 | Kim et al. |
| 7,648,758 B2 | 1/2010 | Morin |
| 7,704,408 B2 | 5/2010 | Fuksatu |
| 7,713,439 B2 | 5/2010 | Murouchi et al. |
| 7,737,198 B2 | 6/2010 | Murouchi et al. |
| 7,790,786 B2 | 9/2010 | Murouchi et al. |
| 7,897,083 B2 | 3/2011 | Fukatsu et al. |
| 7,985,351 B2 | 7/2011 | Yamauchi et al. |
| 7,989,079 B2 | 8/2011 | Lee et al. |
| 8,012,352 B1 | 9/2011 | Giraldo et al. |
| 8,025,814 B2 | 9/2011 | Uehara et al. |
| 8,043,527 B2 | 10/2011 | Iwase et al. |
| 8,043,678 B2 | 10/2011 | Utsumi et al. |
| 8,066,907 B2 | 11/2011 | Kohinata et al. |
| 8,192,645 B2 | 6/2012 | Murouchi et al. |
| 8,222,802 B2 | 7/2012 | Saito et al. |
| 8,226,851 B2 | 7/2012 | Harada et al. |
| 8,231,807 B2 | 7/2012 | Yonezawa et al. |
| 8,309,640 B2 | 11/2012 | Li et al. |
| 8,337,719 B2 | 12/2012 | Hosoda et al. |
| 8,425,798 B2 | 4/2013 | Saito et al. |
| 8,475,924 B2 | 7/2013 | Lee et al. |
| 8,492,464 B2 | 7/2013 | Li et al. |
| 8,545,718 B2 | 10/2013 | Nakayama et al. |
| 8,580,145 B2 | 11/2013 | Osato et al. |
| 8,641,924 B2 | 2/2014 | Sekimura et al. |
| 8,642,682 B2 | 2/2014 | Nishihata |
| 8,692,272 B2 | 4/2014 | Matsumi et al. |
| 8,715,526 B2 | 5/2014 | Kitai et al. |
| 8,816,019 B2 | 8/2014 | Ganguly et al. |
| 8,841,367 B2 | 9/2014 | Zheng et al. |
| 8,883,900 B2 | 11/2014 | Jiang et al. |
| 8,894,880 B2 | 11/2014 | Shin et al. |
| 8,895,649 B2 | 11/2014 | Li et al. |
| 8,926,862 B2 | 1/2015 | Kim et al. |
| 8,927,661 B2 | 1/2015 | Li et al. |
| 8,946,333 B2 | 2/2015 | Raman et al. |
| 8,992,805 B2 | 3/2015 | Nishimura et al. |
| 9,018,286 B2 | 4/2015 | Daga et al. |
| 9,023,923 B2 | 5/2015 | An et al. |
| 9,074,070 B2 | 7/2015 | Yung et al. |
| 9,185,800 B2 | 11/2015 | Meng et al. |
| 9,234,092 B2 | 1/2016 | Nakayama et al. |
| 9,258,892 B2 | 2/2016 | Crosley |
| 9,283,707 B2 | 3/2016 | Saito et al. |
| 9,355,753 B2 | 5/2016 | Kim |
| 9,394,483 B2 | 7/2016 | Wu et al. |
| 9,397,392 B2 | 7/2016 | van Oosterbosch et al. |
| 9,538,646 B2 | 1/2017 | Onodera et al. |
| 9,574,065 B2 | 2/2017 | Miyamoto et al. |
| 9,702,051 B2 | 7/2017 | Demers |
| 9,744,741 B2 | 8/2017 | Cordova et al. |
| 9,896,566 B2 | 2/2018 | Yung et al. |
| 9,944,768 B2 | 4/2018 | Cheng et al. |
| 9,982,113 B2 | 5/2018 | Kniess et al. |
| 10,062,962 B2 | 8/2018 | Kolak et al. |
| 10,106,682 B2 | 10/2018 | Kim |
| 10,119,021 B2 | 11/2018 | Li et al. |
| 10,150,863 B2 | 12/2018 | Wu et al. |
| 10,153,546 B2 | 12/2018 | Kolak et al. |
| 10,174,180 B2 | 1/2019 | Bao et al. |
| 10,233,301 B2 | 3/2019 | Kato et al. |
| 10,273,362 B2 | 4/2019 | Zhang et al. |
| 10,290,389 B2 | 5/2019 | Wu et al. |
| 10,329,422 B2 | 6/2019 | Li et al. |
| 10,604,649 B2 | 3/2020 | Yamanaka |
| 10,697,065 B2 | 6/2020 | Hua et al. |
| 10,714,810 B2 | 7/2020 | Hong et al. |
| 10,741,932 B2 | 8/2020 | Thai et al. |
| 10,767,049 B2 | 9/2020 | Kim |
| 10,784,030 B2 | 9/2020 | Lee et al. |
| 10,822,452 B2 | 11/2020 | Tsuchiya et al. |
| 10,822,453 B2 | 11/2020 | Washino |
| 10,899,900 B2 | 1/2021 | Jung et al. |
| 10,968,311 B2 | 4/2021 | Washino |
| 10,968,347 B2 | 4/2021 | Akiyama et al. |
| 11,028,250 B2 | 6/2021 | Zhang et al. |
| 11,075,442 B2 | 7/2021 | Wang et al. |
| 11,121,447 B2 | 9/2021 | Wu et al. |
| 2004/0165390 A1 | 8/2004 | Sato et al. |
| 2005/0130447 A1 | 6/2005 | Takaya et al. |
| 2007/0057236 A1 | 3/2007 | Hosoda et al. |
| 2008/0187734 A1 * | 8/2008 | Morin ................. H05K 1/0366 428/292.1 |
| 2010/0012354 A1 | 1/2010 | Hedin et al. |
| 2010/0051999 A1 | 3/2010 | Iwase et al. |
| 2010/0053972 A1 | 3/2010 | Nakayama |
| 2010/0263919 A1 | 10/2010 | Lee et al. |
| 2010/0327728 A1 | 12/2010 | Saito et al. |
| 2012/0040128 A1 | 2/2012 | Finn |
| 2012/0164902 A1 | 6/2012 | Wienke et al. |
| 2012/0276390 A1 | 11/2012 | Ji et al. |
| 2014/0060899 A1 | 3/2014 | Park et al. |
| 2014/0128545 A1 | 5/2014 | Xiong et al. |
| 2014/0142571 A1 | 5/2014 | Yung et al. |
| 2014/0159285 A1 | 6/2014 | Choi |
| 2014/0171567 A1 | 6/2014 | Guo et al. |
| 2014/0296411 A1 | 10/2014 | Cheng et al. |
| 2014/0327595 A1 | 11/2014 | Van Oosterbosch et al. |
| 2014/0353543 A1 | 12/2014 | Wu et al. |
| 2015/0337132 A1 | 11/2015 | Van der Burgt |
| 2016/0116948 A1 | 4/2016 | Ou et al. |
| 2016/0301141 A1 | 10/2016 | Del Castillo et al. |
| 2017/0002193 A1 | 1/2017 | Cheng et al. |
| 2017/0273179 A1 | 9/2017 | Kim |
| 2017/0361584 A1 | 12/2017 | Feng et al. |
| 2017/0362731 A1 | 12/2017 | Wang et al. |
| 2017/0367182 A1 | 12/2017 | Wu et al. |
| 2018/0215894 A1 | 8/2018 | Cheng et al. |
| 2018/0230294 A1 | 8/2018 | Cheng et al. |
| 2018/0332710 A1 | 11/2018 | Lin et al. |
| 2018/0346711 A1 | 12/2018 | Van der Burgt et al. |
| 2018/0355150 A1 | 12/2018 | Kim |
| 2018/0362758 A1 | 12/2018 | Wu et al. |
| 2018/0375203 A1 | 12/2018 | Petra et al. |
| 2019/0027813 A1 | 1/2019 | Wang |
| 2019/0031879 A1 | 1/2019 | Ding et al. |
| 2019/0153216 A1 | 5/2019 | Gong et al. |
| 2019/0237851 A1 | 8/2019 | Gu |
| 2019/0269012 A1 | 8/2019 | Van der Burgt |
| 2019/0322861 A1 | 10/2019 | Wei et al. |
| 2019/0341696 A1 | 11/2019 | O'Connor et al. |
| 2019/0352501 A1 | 11/2019 | Wang et al. |
| 2019/0352503 A1 | 11/2019 | Cheng et al. |
| 2020/0017769 A1 | 1/2020 | Konno et al. |
| 2020/0022264 A1 | 1/2020 | Cheng et al. |
| 2020/0040133 A1 | 2/2020 | Washino |
| 2020/0076035 A1 | 3/2020 | Huh et al. |
| 2020/0091608 A1 | 3/2020 | Alpman et al. |
| 2020/0219861 A1 | 7/2020 | Kamgaing et al. |
| 2020/0299582 A1 | 9/2020 | Komatsu |
| 2020/0308487 A1 | 10/2020 | Hegi |

(56) References Cited

U.S. PATENT DOCUMENTS

| | | |
|---|---|---|
| 2020/0347224 A1 | 11/2020 | Hara |
| 2020/0369884 A1 | 11/2020 | Lee et al. |
| 2020/0399465 A1 | 12/2020 | Hara |
| 2021/0024701 A1 | 1/2021 | Wang et al. |
| 2021/0054190 A1 | 2/2021 | Kim |
| 2021/0057811 A1 | 2/2021 | Kim |
| 2021/0057827 A1 | 2/2021 | Kim et al. |
| 2021/0070927 A1 | 3/2021 | Zhang et al. |
| 2021/0070929 A1 | 3/2021 | Kim et al. |
| 2021/0070983 A1 | 3/2021 | Kim et al. |
| 2021/0075093 A1 | 3/2021 | Zhang et al. |
| 2021/0075162 A1 | 3/2021 | Kim et al. |
| 2021/0091818 A1 | 3/2021 | Zhang et al. |
| 2021/0092836 A1 | 3/2021 | Zhang et al. |
| 2021/0130585 A1 | 5/2021 | Wang et al. |
| 2021/0130604 A1 | 5/2021 | Ramakrishnan et al. |
| 2021/0269588 A1 | 9/2021 | Washino |
| 2021/0274652 A1 | 9/2021 | Kim |

FOREIGN PATENT DOCUMENTS

| | | |
|---|---|---|
| CN | 105542408 A | 5/2016 |
| CN | 106633680 A | 5/2017 |
| CN | 107022171 A | 8/2017 |
| CN | 105623206 B | 12/2017 |
| CN | 108045022 A | 5/2018 |
| CN | 108102314 A | 6/2018 |
| CN | 108178906 A | 6/2018 |
| CN | 108250692 A | 7/2018 |
| CN | 207772540 U | 8/2018 |
| CN | 108148433 A | 12/2018 |
| CN | 109301507 A | 2/2019 |
| CN | 109467643 A | 3/2019 |
| CN | 109467722 A | 3/2019 |
| CN | 109509975 A | 3/2019 |
| CN | 208675597 U | 3/2019 |
| CN | 106633860 B | 4/2019 |
| CN | 109735060 A | 5/2019 |
| CN | 109742534 A | 5/2019 |
| CN | 109755729 A | 5/2019 |
| CN | 109755733 A | 5/2019 |
| CN | 109790361 A | 5/2019 |
| CN | 208904227 U | 5/2019 |
| CN | 110154464 A | 8/2019 |
| CN | 209266563 U | 8/2019 |
| CN | 209266570 U | 8/2019 |
| CN | 209266571 U | 8/2019 |
| CN | 209516005 U | 10/2019 |
| CN | 209544599 U | 10/2019 |
| CN | 110505753 A | 11/2019 |
| CN | 110746754 A | 2/2020 |
| CN | 110769594 A | 2/2020 |
| CN | 110903612 A | 3/2020 |
| CN | 111087765 A | 5/2020 |
| CN | 111087797 A | 5/2020 |
| CN | 111117169 A | 5/2020 |
| CN | 111286176 A | 6/2020 |
| CN | 111320848 A | 6/2020 |
| CN | 210706390 U | 6/2020 |
| CN | 111393806 A | 7/2020 |
| EP | 1 852 938 A1 | 11/2007 |
| EP | 2 774 952 B1 | 9/2014 |
| EP | 2 981 573 B1 | 6/2018 |
| EP | 3 674 080 A1 | 7/2020 |
| EP | 3 674 368 A1 | 7/2020 |
| EP | 3 730 545 A1 | 10/2020 |
| JP | 2003268089 A | 9/2003 |
| JP | 2003268241 A | 9/2003 |
| JP | 2004143270 A | 5/2004 |
| JP | 2004277539 A | 10/2004 |
| JP | 2004323705 A | 11/2004 |
| JP | 2005078806 A | 3/2005 |
| JP | 4945097 B2 | 1/2007 |
| JP | 2007154169 A | 6/2007 |
| JP | 2007273537 A | 10/2007 |
| JP | 2009114418 A | 5/2009 |
| JP | 4339966 B2 | 10/2009 |
| JP | 2010254875 A | 11/2010 |
| JP | 2011052037 A | 3/2011 |
| JP | 2011093973 A | 5/2011 |
| JP | 2013108008 A | 6/2013 |
| JP | 5280281 B2 | 9/2013 |
| JP | 5332081 B2 | 11/2013 |
| JP | 2015059178 A | 3/2015 |
| JP | 5866423 B2 | 2/2016 |
| JP | 2016041828 A | 3/2016 |
| JP | 5919613 B2 | 5/2016 |
| JP | 5924527 B2 | 5/2016 |
| JP | 2017095625 A | 6/2017 |
| JP | 2017119378 A | 7/2017 |
| JP | 2017120826 A | 7/2017 |
| JP | 6177191 B2 | 8/2017 |
| JP | 6181587 B2 | 8/2017 |
| JP | 2017179127 A | 10/2017 |
| JP | 2018016753 A | 2/2018 |
| JP | 2018016754 A | 2/2018 |
| JP | 6295013 B2 | 3/2018 |
| JP | 2018030948 A | 3/2018 |
| JP | 6359225 B2 | 7/2018 |
| JP | 2018109090 A | 7/2018 |
| JP | 6405817 B2 | 10/2018 |
| JP | 6405818 B2 | 10/2018 |
| JP | 2018168320 A | 11/2018 |
| JP | 2019006973 A | 1/2019 |
| JP | 6470295 B2 | 2/2019 |
| JP | 2019065263 A | 4/2019 |
| JP | 2019094489 A | 6/2019 |
| JP | 2019094497 A | 6/2019 |
| JP | 2019099618 A | 6/2019 |
| JP | 2019106434 A | 6/2019 |
| JP | 2019116586 A | 7/2019 |
| JP | 2019127556 A | 8/2019 |
| JP | 2019127557 A | 8/2019 |
| JP | 6576754 B2 | 9/2019 |
| JP | 6576808 B2 | 9/2019 |
| JP | 2019189734 A | 10/2019 |
| JP | 2019189735 A | 10/2019 |
| JP | 2019189736 A | 10/2019 |
| JP | 2019189737 A | 10/2019 |
| JP | 6773824 B2 | 10/2020 |
| KR | 102104752 B1 | 4/2020 |
| KR | 102104753 B1 | 4/2020 |
| KR | 20200070501 A | 6/2020 |
| KR | 102167337 B1 | 10/2020 |
| WO | WO 2014/162254 A1 | 10/2014 |
| WO | WO 2014/180550 A1 | 11/2014 |
| WO | WO 2014/203227 A2 | 12/2014 |
| WO | WO 2017/029608 A1 | 2/2017 |
| WO | WO 2018/026601 A1 | 2/2018 |
| WO | WO 2018/038093 A1 | 3/2018 |
| WO | WO 2018/056294 A1 | 3/2018 |
| WO | WO 2018/141769 A1 | 8/2018 |
| WO | WO 2019/042906 A1 | 3/2019 |
| WO | WO 2019/213920 A1 | 11/2019 |
| WO | WO 2020/095997 A1 | 5/2020 |
| WO | WO 2020/194196 A1 | 10/2020 |
| WO | WO 2020/217225 A1 | 10/2020 |

OTHER PUBLICATIONS

Amato, Ing. Francesco, Ph.D., "A Primer on 5G," Jan. 11, 2019, 19 pages.

Bjornson, Emil, "Massive MIMO for 5G," Tutorial at 2015 IEEE International Workshop on Signal Processing Advances in Wireless Communications, (SPAWC), Jun. 29, Stockholm, Sweden 58 pages.

Hassan et al., Massive MIMO Wireless Networks: An Overview, *Electronics*, 2017, 6, 63, pp. 1-29.

Jilani et al., "Millimeter-wave Liquid Crystal Polymer Based Antenna Array for Conformal/5G Applications," *IEEE Antennas and Wireless Propagation Letters*, vol. 18, Issue 1, Jan. 2019, pp. 84-88.

Paper—The Fifth Generation of Wireless Network Communications from TE Connectivity, Apr. 2019, 20 pages.

(56) References Cited

OTHER PUBLICATIONS

Paper—Material Solutions for 5G Applications from SABIC, 2018, 4 pages.
Takata, et al., "Electrical properties and practical applications of Liquid Crystal Polymer flex," *IEEE Polytronic 2007 Conference*, pp. 67-72.
Technical Article—Plastic Materials—Liquid Crystal Polymers from Steinwall Plastic Injection Molding, May 2016, 3 pages.
Theil et al., "The Effect of Thermal Cycling on a-C:F,H Low Dielectric Constant Films Deposited by ECR Plasma Enhanced Chemical Vapor Deposition," *Proceedings for the International Interconnect Technology Conference*, Jun. 1998, p. 128-131, 3 pages.
International Search Report and Written Opinion for PCT/US2020/046881 dated Nov. 4, 2020, 22 pages.
Related Application Form.

* cited by examiner

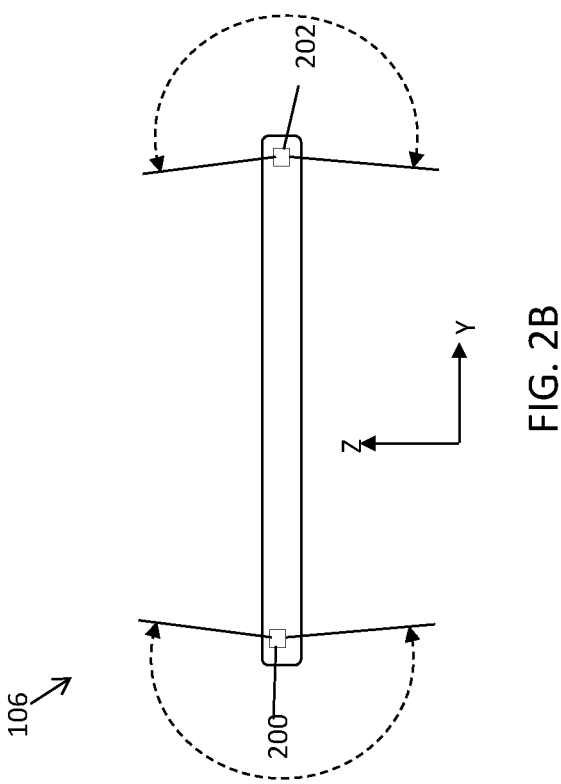
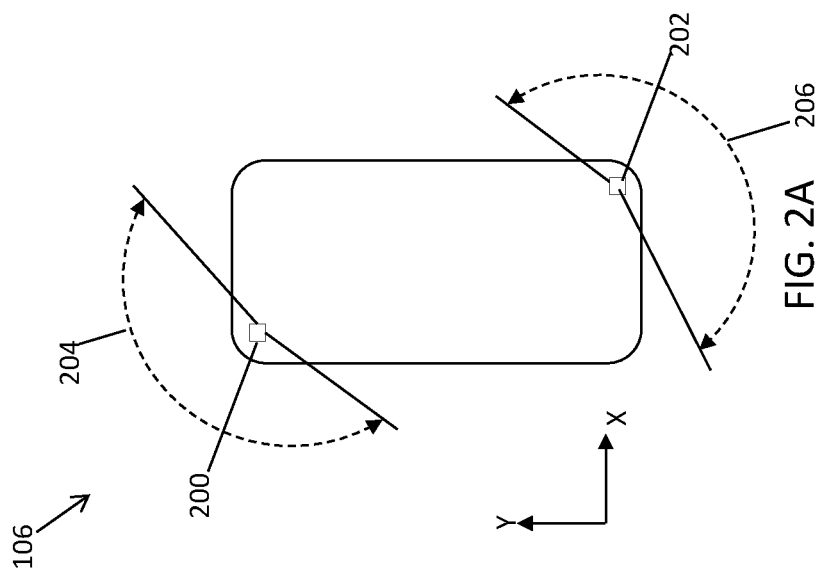

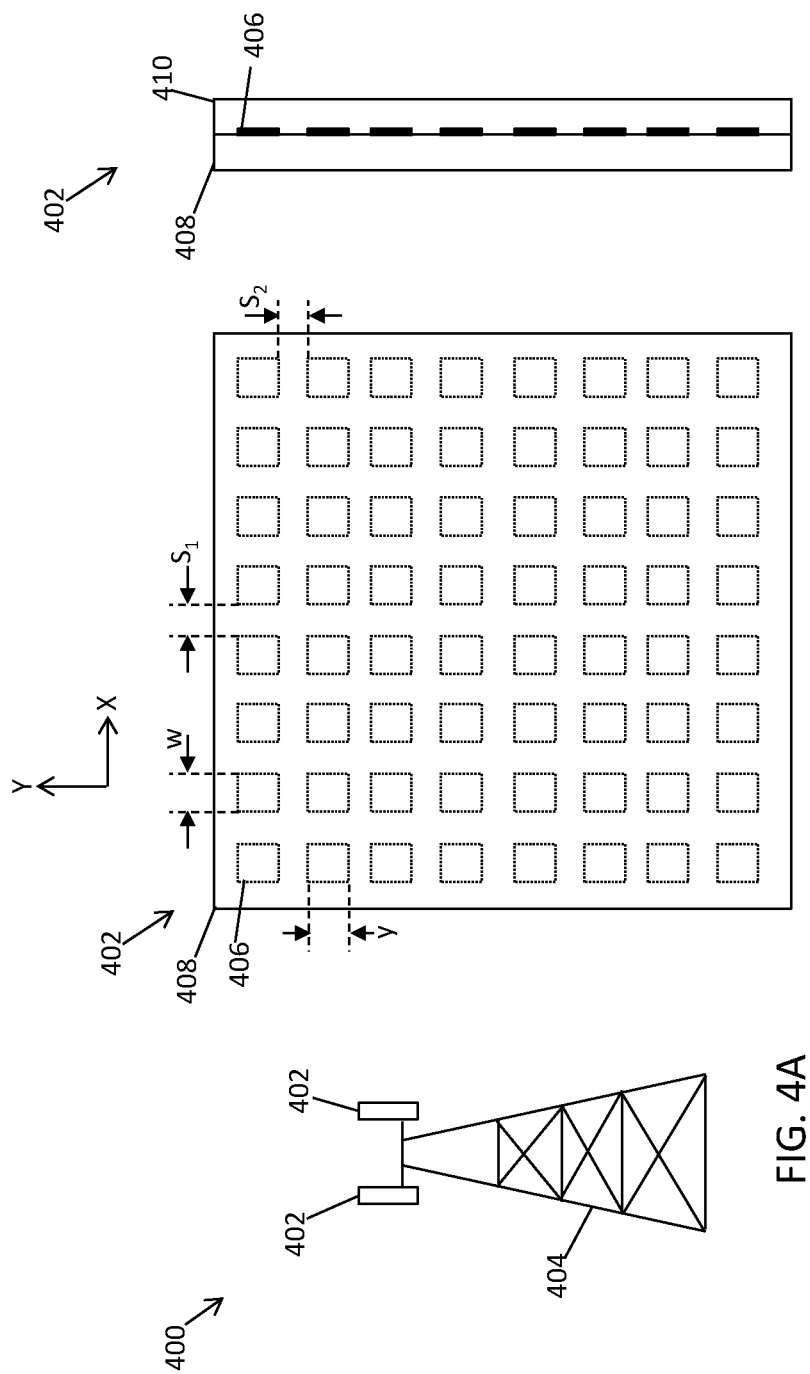

ANTENNA COVER INCLUDING A POLYMER COMPOSITION HAVING A LOW DIELECTRIC CONSTANT AND DISSIPATION FACTOR

CROSS REFERENCE TO RELATED APPLICATION

The present application claims filing benefit of U.S. Provisional Patent Application Ser. No. 62/933,563 having a filing date of Nov. 11, 2019, which is incorporated herein by reference in its entirety.

BACKGROUND OF THE INVENTION

High frequency radio signal communication has increased in popularity. For example, the demand for increased data transmission speed for wireless smartphone connectivity has driven demand for high frequency components, including those configured to operate at 5G spectrum frequencies. A trend towards miniaturization has resulted in a greater number of electronic components in a compact area, for example in a user computing device (e.g., smartphone, laptop). Shielding layers may be used to shield such electronic components. Antennas, however, cannot properly function from beneath shielding layers. As such, the shielding layers can include "windows" of radio frequency-transparent materials that are arranged over the various antennas to allow the antennas to receive and transmit radio frequency signals through the shielding layer. Current materials for such "windows," however, do not exhibit satisfactory characteristics. For example, certain materials do not provide stable performance and other materials tend to be difficult to process.

As such, a need exists for a polymer composition that can have a relatively low dielectric constant and a relatively low dissipation factor but still maintain excellent mechanical properties and processability (e.g., low viscosity) for antenna covers and windows thereof.

SUMMARY OF THE INVENTION

In accordance with one embodiment of the present invention, an antenna cover is disclosed that comprises a layer including a polymer composition. The polymer composition comprises a polymer matrix containing at least one polymer having a glass transition temperature of about 50° C. or more wherein the polymer matrix constitutes from about 30 wt. % to about 90 wt. % of the polymer composition and further wherein the polymer composition exhibits a dielectric constant of about 4 or less and a dissipation factor of about 0.02 or less, as determined at a frequency of 2 GHz.

In accordance with another embodiment of the present invention, a 5G radio frequency communication device is disclosed that comprises a substrate, an antenna element coupled to the substrate, and an antenna cover arranged over the substrate. The antenna cover can include a layer including a polymer composition. The 5G radio frequency communication system can include a radio frequency component communicatively coupled to the antenna element and configured for operation of about 2.5 GHz or greater. The polymer composition comprises a polymer matrix containing at least one polymer having a glass transition temperature of about 50° C. or more wherein the polymer matrix constitutes from about 30 wt. % to about 90 wt. % of the polymer composition and further wherein the polymer composition exhibits a dielectric constant of about 4 or less and a dissipation factor of about 0.02 or less, as determined at a frequency of 2 GHz.

In accordance with another embodiment of the present invention, a base station is disclosed that comprises an antenna array and an antenna cover arranged over the antenna array. The antenna cover comprises a layer including a polymer composition comprising a polymer matrix containing at least one polymer having a glass transition temperature of about 50° C. or more wherein the polymer matrix constitutes from about 30 wt. % to about 90 wt. % of the polymer composition and further wherein the polymer composition exhibits a dielectric constant of about 4 or less and a dissipation factor of about 0.02 or less, as determined at a frequency of 2 GHz.

Other features and aspects of the present invention are discussed in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which:

FIG. 2A illustrates a top-down view of an example user computing device including 5G antennas according to aspects of the present disclosure.

FIG. 2B illustrates a side elevation view of the example user computing device of FIG. 2A including 5G antennas according to aspects of the present disclosure.

FIG. 4A illustrates a simplified schematic side elevation view of a base station according to aspects of the present disclosure.

FIG. 4B illustrates a first side elevation view of an example MIMO antenna array of the base station of FIG. 4A.

FIG. 4C illustrates a second side elevation view of the example MIMO antenna array of the base station of FIG. 4A.

DETAILED DESCRIPTION

Figure 1:
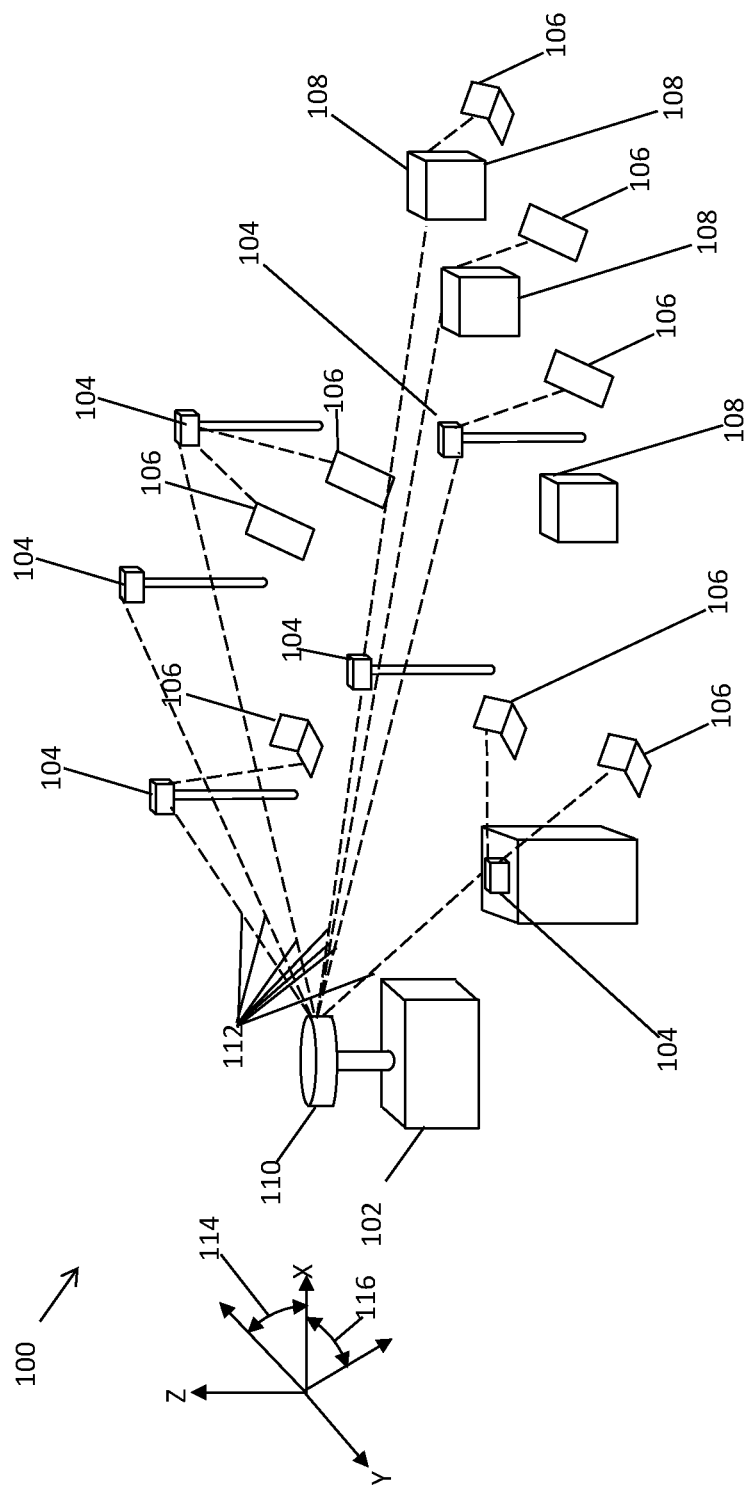
FIG. 1 depicts a 5G communication system including a base station, one or more relay stations, one or more user computing devices, one or more or more Wi-Fi repeaters according to aspects of the present disclosure.

It is to be understood by one of ordinary skill in the art that the present discussion is a description of exemplary embodiments only, and is not intended as limiting the broader aspects of the present disclosure.

In general, the present invention is directed to an antenna cover comprising a polymer composition. The present inventors have discovered that the particular polymer composition disclosed herein can provide not only improved dielectric properties but also an improved adhesion to the other layers and thus provide satisfactory performance as a shielding layer when arranged over antennas. In particular, the polymer composition comprises a polymer matrix containing at least one polymer having a glass transition temperature of about 50° C. or more wherein the polymer composition exhibits a dielectric constant of about 4 or less and a dissipation factor of about 0.02 or less, as determined at a frequency of 2 GHz.

By providing a polymer composition with such relatively low dielectric properties, this may assist in minimizing signal loss and improving performance with respect to receiving and transmitting signals when utilized for a particular application, such as in signal transfer applications and in particular those related to 5G communications. In this regard, the dielectric constant, as determined by the split post resonator method and IEC 60250 at a frequency of 2 GHz, may be about 4 or less, in some embodiments about 3.8 or less, in some embodiments from about 1 to about 3.8, in some embodiments from about 2.5 to about 3.8, and in some embodiments from about 2.6 to about 3.1 or other embodiments from about 3.3 to 3.8, as determined by the split post resonator method and IEC 60250 at a frequency of 2 GHz. In addition, the dissipation factor, a measure of the loss rate of energy, may be about 0.02 or less, in some embodiments about 0.015 or less, in some embodiments about 0.01 or less, in some embodiments from about 0.001 to about 0.01, in some embodiments from about 0.003 to about 0.01, in some embodiments from about 0.004 to about 0.01, in some embodiments from about 0.0055 to about 0.09, and in some embodiments from about 0.007 to about 0.009, as determined by the split post resonator method and IEC 60250 at a frequency of 2 GHz.

Various embodiments of the present invention will now be described in more detail.

I. Polymer Composition

A. Polymer Matrix

Any of a variety of polymers or combinations of polymers may generally be employed in the polymer matrix. For example, the polymer may be semi-crystalline or crystalline in nature. In one embodiment, the polymer may be semi-crystalline. In another embodiment, the polymer may be crystalline. In addition, in one embodiment, the polymer may be an aromatic polymer.

Suitable polymers may include thermoplastic polymers. For example, these polymers may include, for instance, polyesters (e.g., polyethylene terephthalate, polybutylene terephthalate, liquid crystalline polymers), polyarylene sulfides, polyetherimides, polyphenylene oxides, polyarylketones (e.g., polyetheretherketone, polyetherketoneketone, etc.), polycarbonates, etc., as well as blends thereof.

Regardless, the polymers may be generally considered "high performance" polymers such that they have a relatively high glass transition temperature and/or high melting temperature. Such high performance polymers can thus provide a substantial degree of heat resistance to the polymer composition. For example, the polymer may have a glass transition temperature of about 50° C. or more, in some embodiments from about 50° C. to about 250° C., in some embodiments from about 50° C. to about 150° C., and in some embodiments from about 50° C. to about 100° C. The polymer may also have a melting temperature of about 200° C. or more, in some embodiments about 210° C. or more, in some embodiments from about 210° C. to about 400° C., in some embodiments from about 220° C. to about 380° C. The glass transition and melting temperatures may be determined as is well known in the art using differential scanning calorimetry ("DSC"), such as determined by ISO Test No. 11357-2:2013 (glass transition) and 11357-3:2011 (melting).

One example of a suitable semi-crystalline aromatic polymer, for instance, is an aromatic polyester that is a condensation product of an aromatic dicarboxylic acid having 8 to 14 carbon atoms and at least one diol. Suitable diols may include, for instance, neopentyl glycol, cyclohexanedimethanol, 2,2-dimethyl-1,3-propane diol and aliphatic glycols of the formula $HO(CH_2)_nOH$ where n is an integer of 2 to 10. Suitable aromatic dicarboxylic acids may include, for instance, isophthalic acid, terephthalic acid, 1,2-di(p-carboxyphenyl)ethane, 4,4'-dicarboxydiphenyl ether, etc., as well as combinations thereof. Fused rings can also be present such as in 1,4- or 1,5- or 2,6-naphthalene-dicarboxylic acids. Particular examples of such aromatic polyesters may include, for instance, poly(ethylene terephthalate) (PET), poly(1,4-butylene terephthalate) (PBT), poly(1,3-propylene terephthalate) (PPT), poly(1,4-butylene 2,6-naphthalate) (PBN), poly(ethylene 2,6-naphthalate) (PEN), poly(1,4-cyclohexylene dimethylene terephthalate) (PCT), and copolymers and mixtures of the foregoing.

The polyester may have a crystallinity of about 38% or more, in some embodiments about 40% or more, and in some embodiments about 45% or more. The crystallinity of the polyester may generally be about 70% or less, in some embodiments about 65% or less, and in some embodiments about 60% or less. The percent crystallinity may be determined using differential scanning calorimetry (DSC). Such analysis may be performed using a Pyris 6 DSC from PerkinElmer instruments. A detailed description of the calculation is available from Sichina, W. J. "DSC as problem solving tool: measurement of percent crystallinity of thermoplastics." Thermal Analysis Application Note (2000).

In one particular embodiment, the polyester may include a polybutylene terephthalate. In another particular embodiment, the polyester may include a polyethylene terephthalate. In a further particular embodiment, the polyester may include a combination of polybutylene terephthalate and polyethylene terephthalate. In this regard, when utilized in combination, the weight ratio of the polybutylene terephthalate to the polyethylene terephthalate may be more than 1, such as about 1.3 or more, such as about 1.5 or more, such as about 1.7 or more.

In addition, modified or copolymers of polyethylene terephthalate polymers and/or polybutylene terephthalate polymers may also be used. For instance, in one embodiment, a modifying acid or a modifying diol may be used to produce modified polyethylene terephthalate polymers and/or modified polybutylene terephthalate polymers. As used herein, the terms "modifying acid" and "modifying diol" are meant to define compounds, which can form part of the acid and diol repeat units of a polyester, respectively, and which can modify a polyester to reduce its crystallinity or render the polyester amorphous. Of course, the polyesters may be non-modified and do not contain a modifying acid or a modifying diol. In any event, examples of modifying acid components may include, but are not limited to, isophthalic acid, phthalic acid, 1,3-cyclohexanedicarboxylic acid, 1,4-cyclohexane dicarboxylic acid, 2,6-naphthaline dicarboxylic acid, succinic acid, glutaric acid, adipic acid, sebacic acid, suberic acid, 1,12-dodecanedioic acid, etc. In practice, it is often preferable to use a functional acid derivative thereof such as the dimethyl, diethyl, or dipropyl ester of the dicarboxylic acid. The anhydrides or acid halides of these acids also may be employed where practical. Examples of modifying diol components may include, but are not limited to, neopentyl glycol, 1,4-cyclohexanedimethanol, 1,2-propanediol, 1,3-propanediol, 2-methy-1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, 2,2,4,4-tetramethyl cyclobutane diol, Z,8-bis(hydroxymethyltricyclo-[5.2.1.0]-decane wherein Z represents 3, 4, or 5; 1,4-bis(2- hydroxyethoxy)benzene, 4,4'-bis(2-hydroxyethoxy) diphenylether [bis-hydroxyethyl bisphenol A], 4,4'-Bis(2-hydroxyethoxy)diphenylsulfide [bis-hydroxyethyl bisphenol S] and diols containing one or more oxygen atoms in the chain, e.g., diethylene glycol, triethylene glycol, dipropylene glycol, tripropylene glycol, etc. In general, these diols contain 2 to 18, and in some embodiments 2 to 8 carbon atoms. Cycloaliphatic diols can be employed in their cis- or trans-configuration or as mixtures of both forms.

In some examples, at least one polyester or copolyester present in the polymer composition may have an intrinsic viscosity (IV) of from about 0.5 to about 0.9 dL/g, such as from about 0.5 to about 0.8 dL/g. In one embodiment, for instance, the intrinsic viscosity of the polyester is from about 0.65 to about 0.8 dL/g.

Polyarylene sulfides are also suitable semi-crystalline aromatic polymers. The polyarylene sulfide(s) employed in the composition generally have repeating units of the formula:

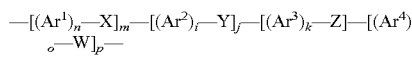

wherein, $Ar^1$, $Ar^2$, $Ar^3$, and $Ar^4$ are independently arylene units of 6 to 18 carbon atoms;

W, X, Y, and Z are independently bivalent linking groups selected from —$SO_2$—, —S—, —SO—, —CO—, —O—, —C(O)O— or alkylene or alkylidene groups of 1 to 6 carbon atoms, wherein at least one of the linking groups is —S—; and n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —$(C_6H_4$—$S)_n$— (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihaloaromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

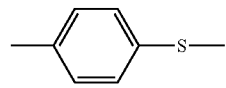

and segments having the structure of formula:

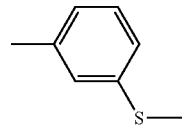

or segments having the structure of formula:

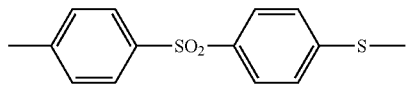

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

Another suitable semi-crystalline aromatic polymer that may be employed in the present invention is a polyaryletherketone. Polyaryletherketones are semi-crystalline polymers with a relatively high melting temperature, such as from about 300° C. to about 400° C., in some embodiments from about 310° C. to about 390° C., and in some embodiments from about 330° C. to about 380° C. The glass transition temperature may likewise be from about 110° C. to about 200° C. Particularly suitable polyaryletherketones are those that primarily include phenyl moieties in conjunction with ketone and/or ether moieties. Examples of such polymers include polyetheretherketone ("PEEK"), polyetherketone ("PEK"), polyetherketoneketone ("PEKK"), polyetherketoneetherketoneketone ("PEKEKK"), polyetheretherketoneketone ("PEEKK"), polyether-diphenyl-ether-ether-diphenyl-ether-phenyl-ketone-phenyl, etc., as well as blends and copolymers thereof.

In addition to the polymers referenced above, crystalline polymers may also be employed in the polymer composition. Particularly suitable are liquid crystalline polymers, which have a high degree of crystallinity that enables them to effectively fill the small spaces of a mold. Liquid crystalline polymers are generally classified as "thermotropic" to the extent that they can possess a rod-like structure and exhibit a crystalline behavior in their molten state (e.g., thermotropic nematic state). These polymers may also be generally referred to as polyesters. The polymers have a relatively high melting temperature, such as from about 250° C. to about 400° C., in some embodiments from about 280° C. to about 390° C., and in some embodiments from about 300° C. to about 380° C. Such polymers may be formed from one or more types of repeating units as is known in the art. A liquid crystalline polymer may, for example, contain one or more aromatic ester repeating units, typically in an amount of from about 60 mol. % to about 99.9 mol. %, in some embodiments from about 70 mol. % to about 99.5 mol. %, and in some embodiments from about 80 mol. % to about 99 mol. % of the polymer. The aromatic ester repeating units may be generally represented by the following Formula (I):

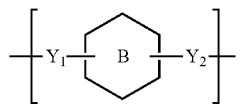

(I)

wherein,
ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and
$Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units (Y is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 5 mol. % to about 60 mol. %, in some embodiments from about 10 mol. % to about 55 mol. %, and in some embodiments from about 15 mol. % to about 50% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute from about 10 mol. % to about 85 mol. %, in some embodiments from about 20 mol. % to about 80 mol. %, and in some embodiments from about 25 mol. % to about 75 mol. % of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments from about 5 mol. % to about 20 mol. % of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments from about 1 mol. % to about 10 mol. % of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, the liquid crystalline polymer may be a "high naphthenic" polymer to the extent that it contains a relatively high content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) may be about 10 mol. % or more, in some embodiments about 20 mol. % or more, in some embodiments from about 30 mol % to about 95 mol. %, and in some embodiments from about 40 mol. % to about 80 mol. % of the polymer. In one particular embodiment, for instance, the repeating units derived from naphthalene-2,6-dicarboxylic acid ("NDA") may constitute about 10 mol. % or more, in some embodiments about 12 mol. % or more, in some embodiments from about 15 mol. % to about 40 mol. %, and in some embodiments from about 18 mol. % to about 35 mol. % of the polymer.

Also, although not necessarily required, the liquid crystalline polymer may be a "low naphthenic" polymer to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than 30 mol. %, in some embodiments no more than about 15 mol. %, in some embodiments no more than about 10 mol. %, in some embodiments no more than about 8 mol. %, and in some embodiments from 0 mol. % to about 5 mol. % of the polymer (e.g., 0 mol. %). Despite the absence of a high level of conventional naphthenic acids, it is believed that the resulting "low naphthenic" polymers are still capable of exhibiting good thermal and mechanical properties.

In one particular embodiment, the liquid crystalline polymer may be formed from repeating units derived from 4-hydroxybenzoic acid ("HBA") and terephthalic acid ("TA") and/or isophthalic acid ("IA"), as well as various other optional constituents. The repeating units derived from 4-hydroxybenzoic acid ("HBA") may constitute from about 10 mol. % to about 80 mol. %, in some embodiments from about 30 mol. % to about 75 mol. %, and in some embodiments from about 45 mol. % to about 70 mol. % of the polymer. The repeating units derived from terephthalic acid ("TA") and/or isophthalic acid ("IA") may likewise constitute from about 5 mol. % to about 40 mol. %, in some embodiments from about 10 mol. % to about 35 mol. %, and in some embodiments from about 15 mol. % to about 35 mol. % of the polymer. Repeating units may also be employed that are derived from 4,4'-biphenol ("BP") and/or hydroquinone ("HQ") in an amount from about 1 mol. % to about 30 mol. %, in some embodiments from about 2 mol. % to about 25 mol. %, and in some embodiments from about 5 mol. % to about 20 mol. % of the polymer. Other possible repeating units may include those derived from 6-hydroxy-2-naphthoic acid ("HNA"), 2,6-naphthalenedicarboxylic acid ("NDA"), and/or acetaminophen ("APAP"). In certain embodiments, for example, repeating units derived from HNA, NDA, and/or APAP may each constitute from about 1 mol. % to about 35 mol. %, in some embodiments from about 2 mol. % to about 30 mol. %, and in some embodiments from about 3 mol. % to about 25 mol. % when employed.

In certain embodiments, it may desirable to employ a blend of polymers within the polymer matrix. For instance, the polymer matrix may contain a first polymer that has a faster crystallization rate than a second polymer. In one embodiment, the first polymer may include a polyethylene terephthalate and the second polymer may include a polybutylene terephthalate polymer. Combining polymers with different crystallization rates may provide various advantages and benefits. For instance, a slower crystallizing polymer (e.g., polybutylene terephthalate) can have a tendency to migrate to the surface of a part and provide good surface gloss and aesthetics, while a faster crystallizing polymer (e.g., polyethylene terephthalate) can enhance mechanical properties. When such a blend is employed, it is typically desired that the first polymer is present in an amount greater than the second polymer. For example, the weight ratio of the first polymer to the second polymer may be from about 1 to about 20, in some embodiments from about 2 to about 15, and in some embodiments from about 3 to about 10. The first polymer may, for instance, constitute from about 10 wt. % to about 40 wt. %, in some embodiments from about 15 wt. % to about 35 wt. %, and in some embodiments from about 20 wt. % to about 30 wt. %, while the second polymer may constitute from about 1 wt. % to about 10 wt. %, in some embodiments from about 2 wt. % to about 9 wt. %, and in some embodiments from about 3 wt. % to about 8 wt. % of the polymer composition.

The polymers within the polymer matrix may be present in an amount of about 30 wt. % or more, in some embodiments about 40 wt. % or more, in some embodiments from about 45 wt. % to about 90 wt. %, and in some embodiments from about 50 wt. % to about 85 wt. % based on the weight of the polymer composition. In one embodiment, at least one polymer may be present within the polymer matrix in the aforementioned concentrations.

B. Impact Modifier

The polymer composition may also include an impact modifier. Generally, the impact modifier includes an olefin copolymer that is "epoxy-functionalized" in that it contains, on average, two or more epoxy functional groups per molecule. The impact modifier generally contains an olefinic monomeric unit that is derived from one or more α-olefins. Examples of such monomers include, for instance, linear and/or branched α-olefins having from 2 to 20 carbon atoms and typically from 2 to 10 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin monomers are ethylene and propylene. For example, in one embodiment, the α-olefin monomer includes at least ethylene. In another embodiment, the α-olefin monomer includes ethylene and octene.

The impact modifier (or polyolefin copolymer) may also contain an epoxy-functional monomeric unit. One example of such a unit is an epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate. Other suitable monomers may also be employed to help achieve the desired molecular weight.

Of course, the impact modifier may also contain other monomeric units as is known in the art. For example, another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one embodiment, the impact modifier may include a copolymer of ethylene and glycidyl methacrylate. In another embodiment, the impact modifier may include a copolymer of ethylene, octene, and glycidyl methacrylate, in particular of, poly(ethylene-octene) and glycidyl methacrylate. Furthermore, in one embodiment, such copolymers may be random copolymers.

In one particular embodiment, the impact modifier may be a copolymer formed from an epoxy-functional (meth)acrylic monomeric component, α-olefin monomeric component, and non-epoxy functional (meth)acrylic monomeric component. The impact modifier may, for instance, be poly(ethylene-co-butylacrylate-co-glycidyl methacrylate.

The relative portion of the monomeric component(s) may be selected to achieve a balance between epoxy functionality and melt flow rate. More particularly, high epoxy monomer contents can result in good adhesion to metal, but too high of a content may reduce the melt flow rate to such an extent that the copolymer adversely impacts the melt strength of the polymer composition. Thus, in most embodiments, the epoxy-functional (meth)acrylic monomer(s) constitute from about 1 wt. % to about 20 wt. %, in some embodiments from about 2 wt. % to about 15 wt. %, and in some embodiments, from about 3 wt. % to about 10 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. However, it should be understood that other monomer concentrations may also be utilized according to the present invention. Regardless, the resulting melt flow rate is typically from about 1 to about 30 grams per 10 minutes ("g/10 min"), in some embodiments from about 2 to about 20 g/10 min, and in some embodiments, from about 3 to about 15 g/10 min, as determined in accordance with ASTM D1238-13 at a load of 2.16 kg and temperature of 190° C.

The epoxy-functionalized component may, in some embodiments, be produced from the selected monomers via copolymerization processes, grafting process, or both. For example, in some embodiments, the epoxy-functional monomer is grafted to an olefinic monomer. As an example, glycidyl methacrylate may be grafted to an olefin component. These may include glycidyl methacrylate grafted to a polyethylene, such as a high density polyethylene, to form GMA-g-PE as well as glycidyl methacrylate grafted to a polyethylene-octene to form GMA-g-PE.

One example of a suitable epoxy-functionalized copolymer that may be used in the present invention is commercially available from Arkema under the name LOTADER® AX8840. LOTADER® AX8840, for instance, has a melt flow rate of 5 g/10 min and is a random copolymer of ethylene and a glycidyl methacrylate (monomer content of 8 wt. %). Another suitable copolymer is commercially available from Arkema under the name LOTADER® AX8900, which is a terpolymer of ethylene, acrylic ester, and glycidyl methacrylate and has a melt flow rate of 6 g/10 min and a glycidyl methacrylate monomer content of 8 wt. %. Another suitable copolymer is commercially available from DuPont under the name ELVALOY® PTW, which is a terpolymer of ethylene, butyl acrylate, and glycidyl methacrylate and has a melt flow rate of 12 g/10 min and a glycidyl methacrylate monomer content of 4 wt. % to 5 wt. %.

It should also be understood that additional impact modifiers may also be employed in the polymer composition if so desired. Examples of such impact modifiers may include, for instance, polyurethanes, polybutadiene, acrylonitrile-butadiene-styrene, polyamides, block copolymers (e.g., polyether-polyamide block copolymers), etc., as well as mixtures thereof.

The impact modifier may be present in an amount of about 0.1 wt. % or more, in some embodiments about 0.5 wt. % or more, in some embodiments from about 1 wt. % to about 40 wt. %, in some embodiments from about 2 wt. % to about 30 wt. %, and in some embodiments from about 3 wt. % to about 20 wt. % of the polymer composition.

C. Fibrous Filler

A fibrous filler may also be employed in the polymer composition to improve the thermal and mechanical properties of the polymer composition without having a significant impact on electrical performance. The fibrous filler typically includes fibers having a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments from about 3,000 MPa to about 6,000 MPa. To help maintain the desired dielectric properties, such high strength fibers may be formed from materials that are generally insulative in nature, such as glass, ceramics or minerals (e.g., alumina or silica), aramids (e.g., Kevlar® marketed by E. I. duPont de Nemours, Wilmington, Del.), minerals, polyolefins, polyesters, etc.

In one embodiment, the fibrous filler may include glass fibers, mineral fibers, or a mixture thereof. For instance, in one embodiment, the fibrous filler may include glass fibers. The glass fibers particularly suitable may include E-glass, A-glass, C-glass, D-glass, AR-glass, R-glass, S1-glass, S2-glass, etc. In another embodiment, the fibrous filler may include mineral fibers. The mineral fibers may include those derived from silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite); tectosilicates, etc.; sulfates, such as calcium sulfates (e.g., dehydrated or anhydrous gypsum); mineral wools (e.g., rock or slag wool); and so forth. Particularly suitable are inosilicates, such as wollastonite fibers available from Nyco Minerals under the trade designation NYGLOS® (e.g., NYGLOS® 4 W or NYGLOS® 8).

Further, although the fibrous fillers may have a variety of different sizes, fibers having a certain aspect ratio can help improve the mechanical properties of the polymer composition. That is, fibrous fillers having an aspect ratio (average length divided by nominal diameter) of about 2 or more, in some embodiments about 4 or more, in some embodiments from about 5 to about 50, and in some embodiments from about 8 to about 40 may be particularly beneficial. Such fibrous fillers may, for instance, have a weight average length of about 10 micrometer or more, in some embodiments about 25 micrometers or more, in some embodiments from about 50 micrometers or more to about 800 micrometers or less, and in some embodiments from about 60 micrometers to about 500 micrometers. Also, such fibrous fillers may, for instance, have a volume average length of about 10 micrometer or more, in some embodiments about 25 micrometers or more, in some embodiments from about 50 micrometers or more to about 800 micrometers or less, and in some embodiments from about 60 micrometers to about 500 micrometers.

The fibrous fillers may likewise have a nominal diameter of about 5 micrometers or more, in some embodiments about 6 micrometers or more, in some embodiments from about 8 micrometers to about 40 micrometers, and in some embodiments from about 9 micrometers to about 20 micrometers. The relative amount of the fibrous filler may also be selectively controlled to help achieve the desired mechanical and thermal properties without adversely impacting other properties of the polymer composition, such as its flowability and dielectric properties, etc. In this regard, the fibrous fillers may have a dielectric constant of about 6 or less, in some embodiments about 5.5 or less, in some embodiments from about 1.1 to about 5, and in some embodiments from about 2 to about 4.8 at a frequency of 1 GHz.

The fibrous filler may be in a modified or an unmodified form, e.g. provided with a sizing, or chemically treated, in order to improve adhesion to the plastic. In some examples, glass fibers may be provided with a sizing to protect the glass fiber, to smooth the fiber but also to improve the adhesion between the fiber and a matrix material. If present, a sizing may comprise silanes, film forming agents, lubricants, wetting agents, adhesive agents optionally antistatic agents and plasticizers, emulsifiers and optionally further additives. In one particular embodiment, the sizing may include a silane. Specific examples of silanes are aminosilanes, e.g. 3-trimethoxysilylpropylamine, N-(2-aminoethyl)-3-aminopropyltrimethoxy-silane, N-(3-trimethoxysilanyl-propyl)ethane-1,2-diamine, 3-(2-aminoethyl-amino) propyltrimethoxysilane, N-[3-(trimethoxysilyl)propyl]-1,2-ethane-diamine.

The fibrous fillers may generally have a relatively flat cross-sectional dimension in that they have an aspect ratio (i.e., cross-sectional width divided by cross-sectional thickness) of from about 1.5 to about 30, in some embodiments from about 2 to about 20, in some embodiments from about 3 to about 10, and in some embodiments from about 3 to about 6. The fibrous fillers may, for example, have a nominal width of from about 1 to about 50 micrometers, in some embodiments from about 5 to about 50 micrometers, and in some embodiments, from about 10 to about 35 micrometers. The fibrous fillers may also have a nominal thickness of from about 0.5 to about 30 micrometers, in some embodiments from about 1 to about 20 micrometers, and in some embodiments, from about 3 to about 15 micrometers. Further, the fibrous fillers may have a narrow size distribution. That is, at least about 60% by volume of the fibrous fillers, in some embodiments at least about 70% by volume of the fibrous fillers, and in some embodiments, at least about 80% by volume of the fibrous fillers may have a width and/or thickness within the ranges noted above. The volume average length of the fibrous fillers may be from about 10 to about 500 micrometers, in some embodiments from about 100 to about 400 micrometers, and in some embodiments, from about 150 to about 350 micrometers.

The fibrous filler may, for instance, constitute about 1 wt. % or more, in some embodiments about 2 wt. % or more, in some embodiments from about 3 wt. % to about 40 wt. %, and in some embodiments from about 5 wt. % to about 30 wt. % of the polymer composition.

D. Dielectric Filler

To help achieve the desired dielectric properties, the polymer composition may also contain dielectric fillers. These fillers may be employed in an amount sufficient to lower the dielectric constant of the polymer as indicated above. For instance, the dielectric filler may be able to reduce the dielectric constant of the polymer matrix by about 2% or more, in some embodiments about 3% or more, in some embodiments from about 3.5% to about 50%, and in some embodiments from about 4% to about 30%. Similarly, the dielectric filler may be able to reduce the dissipation factor of the polymer matrix by about 2% or more, in some embodiments about 3% or more, in some embodiments from about 3.5% to about 50%, and in some embodiments from about 4% to about 30%. Regardless, in one embodiment, these fillers may have a dielectric constant of about 3.0 or less, in some embodiments about 2.5 or less, in some embodiments from about 1.1 to about 2.3, and in some embodiments from about 1.2 to about 2.0 at 100 MHz.

These dielectric fillers may be organic dielectric fillers, inorganic dielectric fillers, or a mixture thereof. In one embodiment, these fillers may include inorganic dielectric fillers. These dielectric fillers may include hollow inorganic fillers, glass flakes, polymeric fillers, or a mixture thereof. In one embodiment, the dielectric fillers include hollow inorganic fillers. In another embodiment, the dielectric fillers include glass flakes. In a further embodiment, the dielectric fillers include polymeric fillers.

The dielectric filler may, for instance, constitute about 1 wt. % or more, in some embodiments about 4 wt. % or more, in some embodiments from about 5 wt. % to about 40 wt. %, and in some embodiments from about 10 wt. % to about 30 wt. % of the polymer composition.

i. Hollow Inorganic Fillers

To help achieve the desired dielectric properties, the dielectric fillers may include hollow inorganic fillers. In particular, the hollow inorganic fillers may have a certain size to help improve the dielectric properties of the polymer composition. Also, the hollow inorganic fillers may also be excellent in strength while allowing the polymer composition to have a reduced weight.

In general, the hollow inorganic fillers have an interior hollow space or cavity and may be synthesized using techniques known in the art. The hollow inorganic fillers may be made from conventional materials. For instance, the hollow inorganic fillers may include alumina, silica, zirconia, magnesia, glass, fly ash, borate, phosphate, ceramic, and the like. In one embodiment, the hollow inorganic fillers may include hollow glass fillers, hollow ceramic fillers, and mixtures thereof. In one embodiment, the hollow inorganic fillers include hollow glass fillers.

The hollow glass fillers may be made from a soda lime borosilicate glass, a soda lime glass, a borosilicate glass, a sodium borosilicate glass, a sodium silicate glass, or an aluminosilicate glass. In this regard, in one embodiment, the composition of the glass, while not limited, may be at least about 65% by weight of $SiO_2$, 3-15% by weight of $Na_2O$, 8-15% by weight of CaO, 0.1-5% by weight of MgO, 0.01-3% by weight of $Al_2O_3$, 0.01-1% by weight of $K_2O$, and optionally other oxides (e.g., $Li_2O$, $Fe_2O_3$, $TiO_2$, $B_2O_3$). In another embodiment, the composition may be about 50-58% by weight of $SiO_2$, 25-30% by weight of $Al_2O_3$, 6-10% by weight of CaO, 1-4% by weight of $Na_2O/K_2O$, and 1-5% by weight of other oxides. Also, in one embodiment, the hollow glass fillers may include more alkaline earth metal oxides than alkali metal oxides. For example, the weight ratio of the alkaline earth metal oxides to the alkali metal oxides may be more than 1, in some embodiments about 1.1 or more, in some embodiments about 1.2 to about 4, and in some embodiments from about 1.5 to about 3. Regardless of the above, it should be understood that the glass composition may vary depending on the type of glass utilized and still provide the benefits as desired by the present invention.

The hollow inorganic fillers may have at least one dimension having an average value that is about 1 micrometers or more, in some embodiments about 5 micrometers or more, in some embodiments about 8 micrometers or more, in some embodiments from about 1 micrometer to about 150 micrometers, in some embodiments from about 10 micrometers to about 150 micrometers, and in some embodiments from about 12 micrometers to about 50 micrometers. In one embodiment, such average value may refer to a $d_{50}$ value.

Furthermore, the hollow inorganic fillers may have a $D_{10}$ of about 1 micrometer or more, in some embodiments about 3 micrometers or more, in some embodiments from about 5 micrometers to about 20 micrometers, and in some embodiments from about 6 micrometers to about 15 micrometers. The hollow inorganic fillers may have a $D_{90}$ of about 10 micrometers or more, in some embodiments about 15 micrometers or more, in some embodiments from about 20 micrometers to about 150 micrometers, and in some embodiments from about 22 micrometers to about 50 micrometers.

In this regard, the hollow inorganic fillers may be present in a size distribution, which may be a Gaussian, normal, or non-normal size distribution. In one embodiment, the hollow inorganic fillers may have a Gaussian size distribution. In another embodiment, the hollow inorganic fillers may have a normal size distribution. In a further embodiment, the hollow inorganic fillers may have a non-normal size distribution. Examples of non-normal size distributions may include unimodal and multi-modal (e.g., bimodal) size distributions.

When referring to dimensions above, such dimension may be any dimension. In one embodiment, however, such dimension refers to a diameter. For example, such value for the dimension refers to an average diameter of spheres. The dimension, such as the average diameter, may be determined in accordance to 3M QCM 193.0. In this regard, in one embodiment, the hollow inorganic fillers may be referring to hollow spheres such as hollow glass spheres. For instance, the hollow inorganic fillers may have an average aspect ratio of approximately 1. In general, the average aspect ratio may be about 0.8 or more, in some embodiments about 0.85 or more, in some embodiments from about 0.9 to about 1.3, and in some embodiments from about 0.95 to about 1.05.

In addition, the hollow inorganic fillers may have relatively thin walls to help with the dielectric properties of the polymer composition as well as the reduction in weight. The thickness of the wall may be about 50% or less, in some embodiments about 40% or less, in some embodiments from about 1% to about 30%, and in some embodiments from about 2% to about 25% the average dimension, such as the average diameter, of the hollow inorganic fillers.

In addition, the hollow inorganic fillers may have a certain true density that can allow for easy handling and provide a polymer composition having a reduction in weight. In general, the true density refers to the quotient obtained by dividing the mass of a sample of the hollow fillers by the true volume of that mass of hollow fillers wherein the true volume is referred to as the aggregate total volume of the hollow fillers. In this regard, the true density of the hollow inorganic fillers may be about 0.1 $g/cm^3$ or more, in some embodiments about 0.2 $g/cm^3$ or more, in some embodiments from about 0.3 $g/cm^3$ or more to about 1.2 $g/cm^3$, and in some embodiments from about 0.4 $g/cm^3$ or more to about 0.9 $g/cm^3$. The true density may be determined in accordance to 3M QCM 14.24.1.

Even though the fillers are hollow, they may have a mechanical strength that allows for maintaining the integrity of the structure of the fillers resulting in a lower likelihood of the fillers being broken during processing and/or use. In this regard, the isotactic crush resistance (i.e., wherein at least 80 vol. %, such as at least 90 vol. % of the hollow fillers survive) of the hollow inorganic fillers may be about 20 MPa or more, in some embodiments about 100 MPa or more, in some embodiments from about 150 MPa to about 500 MPa, and in some embodiments from about 200 MPa to about 350 MPa. The isotactic crush resistance may be determined in accordance to 3M QCM 14.1.8.

The alkalinity of the hollow inorganic fillers may be about 1.0 meq/g or less, in some embodiments about 0.9 meq/g or less, in some embodiments from about 0.1 meq/g to about 0.8 meq/g, and in some embodiments from about 0.2 meq/g to about 0.7 meq/g. The alkalinity may be determined in accordance to 3M QCM 55.19. In order to provide a relatively low alkalinity, the hollow inorganic fillers may be treated with a suitable acid, such as a phosphoric acid.

In addition, the hollow inorganic fillers may also include a surface treatment to assist with providing a better compatibility with the polymer and/or other components within the polymer composition. As an example, the surface treatment may be a silanization. In particular, the surface treatment agents may include, but are not limited to, aminosilanes, epoxysilanes, and the like.

ii. Glass Flakes

To help achieve the desired dielectric properties, the low dielectric constant inorganic fillers may include glass flakes. In particular, the glass flakes may have a certain size to help improve the dielectric properties of the polymer composition. Also, the glass flakes may also be excellent in strength thereby providing the polymer composition with a desired mechanical strength.

The flakes may have a relatively high aspect ratio (e.g., average length or diameter divided by average thickness), such as about 4 or more, in some embodiments about 8 or more, in some embodiments from about 10 to about 1,500, and in some embodiments from about 25 to about 1,000. The average thickness may, for instance, be about 10 micrometers or less, in some embodiments about 8 micrometers or less, in some embodiments from about 0.01 micrometers to about 6 micrometers or less, and in some embodiments from about 0.1 micrometers to about 5 micrometers. In this regard, glass flakes are generally differentiated from fibrous fillers by their non-fibrous nature.

iii. Polymeric Filler

To help achieve the desired dielectric properties, the dielectric fillers may include polymeric fillers. The polymeric fillers may generally be any polymer that has a relatively low dielectric constant. In this regard, the polymeric filler may be a polyethylene polymer. As used herein, a polyethylene polymer refers to a polymer made from over 90% ethylene derived units, such as greater than 95% ethylene derived units, or 100% ethylene derived units. The polyethylene can be a homopolymer or a copolymer, including a terpolymer, having other monomeric units.

As described above, in one embodiment, the polyethylene is a homopolymer of ethylene. In another embodiment, the polyethylene may be a copolymer. For instance, the polyethylene may be a copolymer of ethylene and another olefin containing from 3 to 16 carbon atoms, such as from 3 to 10 carbon atoms, such as from 3 to 8 carbon atoms. These other olefins include, but are not limited to, propylene, 1-butene, 1-pentene, 1-hexene, 1-heptene, 1-octene, 4-methylpent-1-ene, 1-decene, 1-dodecene, 1-hexadecene and the like. Also, utilizable herein are polyene comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. However, when present, the amount of the non-ethylene monomer(s) in the copolymer may be less than about 10 mol. %, such as less than about 5 mol. %, such as less than about 2.5 mol. %, such as less than about 1 mol. %, wherein the mol. % is based on the total moles of monomer in the polymer.

In addition, the polymer composition may be comprised of a blend of one or more polyethylene polymers or copolymers and another thermoplastic polymer such as a polypropylene, a polybutylene, a polymethylpentene, a linear low density polyethylene, or mixtures thereof.

In one embodiment, ultrahigh-molecular-weight polyethylene (UHMW-PE) can be employed for example as a powder, in particular as a micro powder. The UHMW-PE generally has a mean particle diameter $D_{50}$ (volume based and determined by light scattering) in the range of 1 to 500 µm, in some embodiments from 1 to 300 µm, in some embodiments from 50 to 200 µm, in some embodiments from 100 to 200 µm, and in some embodiments from 120 to 180 µm. In one embodiment, the polyethylene can be a free-flowing powder. The powder particle size can be measured utilizing a laser diffraction method according to ISO 13320. In one embodiment, 90% of the polyethylene can have a particle size of less than about 250 micrometers. In other embodiments, 90% of the polyethylene can have a particle size of less than about 200 micrometers.

The molecular weight of the polyethylene polymer can vary depending upon the particular application. For instance, the polyethylene used to produce the particles can comprise a high molecular weight polyethylene, a very high molecular weight polyethylene, and/or an ultrahigh molecular weight polyethylene. "High molecular weight polyethylene" refers to polyethylene compositions with weight-average molecular weight of at least about $3 \times 10^5$ g/mol and, as used herein, is intended to include very-high molecular weight polyethylene and ultra-high molecular weight polyethylene. For purposes of the present specification, the molecular weights referenced herein are determined in accordance with the Margolies equation ("Margolies molecular weight"). "Very-high molecular weight polyethylene" refers to polyethylene compositions with a weight average molecular weight of less than about $3 \times 10^6$ g/mol and more than about $1 \times 10^6$ g/mol. In some embodiments, the molecular weight of the very-high molecular weight polyethylene composition is between about $2 \times 10^6$ g/mol and less than about $3 \times 10^6$ g/mol. "Ultra-high molecular weight polyethylene" refers to polyethylene compositions with weight-average molecular weight of at least about $3 \times 10^6$ g/mol. In some embodiments, the molecular weight of the ultra-high molecular weight polyethylene composition is between about $3 \times 10^6$ g/mol and about $30 \times 10^6$ g/mol, or between about $3 \times 10^6$ g/mol and about $20 \times 10^6$ g/mol, or between about $3 \times 10^6$ g/mol and about $10 \times 10^6$ g/mol, or between about $3 \times 10^6$ g/mol and about $6 \times 10^6$ g/mol.

The polyethylene polymer, for instance, may have an average molecular weight, as determined according to the Margolies equation. The molecular weight can be determined by first measuring the viscosity number according to DIN EN ISO Test 1628. Dry powder flow is measured using a 25 mm nozzle. The molecular weight is then calculated using the Margolies equation from the viscosity numbers, of at least or greater than about 500,000 g/mol, in some embodiments greater than about 1,000,000 g/mol, in some embodiments from about 1,500,000 g/mol to about 12,000,000 g/mol, and in some embodiments from about 2,000,000 g/mol to about 10,000,000 g/mol. Regardless, the molecular weight of the polyethylene can be adjusted by adding hydrogen during synthesis. Also, altering the temperature and/or the type and concentration of the co-catalyst may be conducted to fine tune the molecular weight.

In one embodiment, the polyethylene may have a monomodal molecular weight distribution. Alternatively, the polyethylene may exhibit a bimodal molecular weight distribution. For instance, a bimodal distribution generally refers to a polymer having a distinct higher molecular weight and a distinct lower molecular weight (e.g. two distinct peaks) on a size exclusion chromatography or gel permeation chromatography curve. In another embodiment, the polyethylene may exhibit more than two molecular weight distribution peaks such that the polyethylene exhibits a multimodal (e.g., trimodal, tetramodal, etc.) distribution. Alternatively, the polyethylene may exhibit a broad molecular weight distribution wherein the polyethylene is comprised of a blend of higher and lower molecular weight components such that the size exclusion chromatography or gel permeation chromatography curve does not exhibit at least two distinct peaks but instead exhibits one distinct peak broader than the individual component peaks.

In one embodiment, the polymer composition may be comprised of more than one polyethylene, each having a different molecular weight and/or molecular weight distribution. For instance, the molecular weight distribution may be within the average molecular weight specifications provided above.

In addition to the molecular weight, the polyethylene may also be one having a particular density. In this regard, in one embodiment, the polyethylene may be a high density polyethylene. In general, a high density polyethylene has a density of about 0.93 g/cm³ or greater, in some embodiments from about 0.93 g/cm³ to about 0.97 g/cm³.

The polyethylene may have a viscosity number of from at least 100 mL/g in some embodiments at least 500 mL/g, in some embodiments from about 1,500 mL/g to about 6,000 mL/g, and in some embodiments from about 2,000 mL/g to about 5,000 mL/g, as determined according to ISO 1628 part 3 utilizing a concentration in decahydronaphthalene of 0.0002 g/mL. The polyethylene can have a melt flow rate determined at 190° C. and at a load of 21.6 kg of less than 1 g/10 min in some embodiments less than about 0.5 g/10 min, in some embodiments less than about 0.1 g/10 min and generally greater than 0.001 g/10 min when determined according to ISO Test 1133.

In addition, the polyethylene may have a certain crystallinity. For example, the crystallinity may be 40% or more, in some embodiments about 45% or more in some embodiments from about 50% to about 90%, and in some embodiments from about 50% to about 80%.

E. Epoxy Resin

The polymer composition may also contain an epoxy resin. The epoxy resin may have a certain epoxy equivalent weight that is particularly effective for use in the present invention. Namely, the epoxy equivalent weight is generally from about 250 to about 1,500, in some embodiments from about 400 to about 1,000, and in some embodiments, from about 500 to about 800 grams per gram equivalent as determined in accordance with ASTM D1652-11e1. The epoxy resin also typically contains, on the average, at least about 1.3, in some embodiments from about 1.6 to about 8, and in some embodiments, from about 3 to about 5 epoxide groups per molecule. The epoxy resin also typically has a relatively low dynamic viscosity, such as from about 1 centipoise to about 25 centipoise, in some embodiments 2 centipoise to about 20 centipoise, and in some embodiments, from about 5 centipoise to about 15 centipoise, as determined in accordance with ASTM D445-15 at a temperature of 25° C. At room temperature (25° C.), the epoxy resin is also typically a solid or semi-solid material having a melting point of from about 50° C. to about 120° C., in some embodiments from about 60° C. to about 110° C., and in some embodiments, from about 70° C. to about 100° C.

The epoxy resin can be saturated or unsaturated, linear or branched, aliphatic, cycloaliphatic, aromatic or heterocyclic, and may bear substituents which do not materially interfere with the reaction with the oxirane. Suitable epoxy resins include, for instance, glycidyl ethers (e.g., diglycidyl ether) that are prepared by reacting an epichlorohydrin with a hydroxyl compound containing at least 1.5 aromatic hydroxyl groups, optionally under alkaline reaction conditions. Dihydroxyl compounds are particularly suitable. For instance, the epoxy resin may be a diglycidyl ether of a dihydric phenol, diglycidyl ether of a hydrogenated dihydric phenol, etc. Diglycidyl ethers of dihydric phenols may be formed, for example, by reacting an epihalohydrin with a dihydric phenol. Examples of suitable dihydric phenols include, for instance, 2,2-bis(4-hydroxyphenyl) propane ("bisphenol A"); 2,2-bis 4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5 dihydroxynaphthalene; 1,1-bis(4-hydroxy-3-alkylphenyl) ethane, etc. Suitable dihydric phenols can also be obtained from the reaction of phenol with aldehydes, such as formaldehyde) ("bisphenol F"). Commercial available examples of such epoxy resins may include EPON™ Resins available from Hexion, Inc. under the designations 862, 828, 826, 825, 1001, 1002, SU3, 154, 1031, 1050, 133, and 165.

The epoxy resin may, for instance, constitute from about 0.01 wt. % to about 3 wt. %, in some embodiments from about 0.05 wt. % to about 2 wt. %, and in some embodiments from about 0.1 to about 1 wt. % of the polymer composition.

F. Other Additives

A wide variety of additional additives can also be included in the polymer composition, such as lubricants, thermally conductive fillers, pigments, antioxidants, stabilizers, surfactants, waxes, flame retardants, anti-drip additives, nucleating agents (e.g., boron nitride), flow modifiers, coupling agents, antimicrobials, pigments or other colorants, impact modifiers, and other materials added to enhance properties and processability. Such optional materials may be employed in the polymer composition in conventional amounts and according to conventional processing techniques. When employed, for example, such additive(s) typically constitute from about 0.05 wt. % to about 5 wt. %, and in some embodiments from about 0.1 wt. % to about 1 wt. % of the polymer composition.

In one embodiment, the polymer composition may include an antioxidant. In particular, the antioxidant may be a sterically hindered phenolic antioxidant. Examples of such phenolic antioxidants include, for instance, calcium bis (ethyl 3,5-di-tert-butyl-4-hydroxybenzylphosphonate) (Irganox® 1425); terephthalic acid, 1,4-dithio-, S,S-bis(4-tert-butyl-3-hydroxy-2,6-dimethylbenzyl) ester (Cyanox®1729); triethylene glycol bis(3-tert-butyl-4-hydroxy-5-methylhydrocinnamate); hexamethylene bis(3,5-di-tert-butyl-4-hydroxyhydrocinnamate (Irganox®259); 1,2-bis(3,5,di-tert-butyl-4-hydroxyhydrocinnamoyl)hydrazide (Irganox®1024); 4,4'-di-tert-octyldiphenamine (Naugalube®438R); phosphonic acid, (3,5-di-tert-butyl-4-hydroxybenzyl)-, dioctadecyl ester (Irganox® 1093); 1,3,5-trimethyl-2,4,6-tris(3',5'-di-tert-butyl-4' hydroxybenzyl) benzene (Irganox®1330); 2,4-bis(octylthio)-6-(4-hydroxy-3,5-di-tert-butylanilino)-1,3,5-triazine (Irganox®565); isooctyl 3-(3,5-di-tert-butyl-4-hydroxyphenyl)propionate (Irganox® 1135); octadecyl 3-(3,5-di-tert-butyl-4-hydroxyphenyl)propionate (Irganox® 1076); 3,7-bis(1,1,3,3-tetramethylbutyl)-10H-phenothiazine (Irganox® LO 3); 2,2'-methylenebis(4-methyl-6-tert-butylphenol)monoacrylate (Irganox® 3052); 2-tert-butyl-6-[1-(3-tert-butyl-2-hydroxy-5-methylphenyl)ethyl]-4-methylphenyl acrylate (Sumilizer® TM 4039); 2-[1-(2-hydroxy-3,5-di-tert-pentylphenyl)ethyl]-4,6-di-tert-pentylphenyl acrylate (Sumilizer® GS); 1,3-dihydro-2H-Benzimidazole (Sumilizer® MB); 2-methyl-4,6-bis[(octylthio)methyl]phenol (Irganox®1520); N,N'-trimethylenebis-[3-(3,5-di-tert-butyl-4-hydroxyphenyl)propionamide (Irganox®1019); 4-n-octadecyloxy-2,6-diphenylphenol (Irganox® 1063); 2,2'-ethylidenebis[4,6-di-tert-butylphenol](Irganox® 129); N N'-hexamethylenebis(3,5-di-tert-butyl-4-hydroxyhydrocinnamamide) (Irganox® 1098); diethyl (3,5-di-tert-butyl-4-hydroxybenxyl)phosphonate (Irganox® 1222); 4,4'-di-tert-octyldiphenylamine (Irganox® 5057); N-phenyl-1- napthalenamine (Irganox® L 05); tris[2-tert-butyl-4-(3-tert-butyl-4-hydroxy-6-methylphenylthio)-5-methyl phenyl] phosphite (Hostanox® OSP 1); zinc dinonyidithiocarbamate (Hostanox® VP-ZNCS 1); 3,9-bis[1,1-diimethyl-2-[(3-tert-butyl-4-hydroxy-5-methylphenyl)propionyloxy]ethyl]-2,4,8,10-tetraoxaspiro[5.5]undecane (Sumilizer® AG80); pentaerythrityl tetrakis[3-(3,5-di-tert-butyl-4-hydroxyphenyl) propionate] (Irganox® 1010); ethylene-bis(oxyethylene)bis[3-(5-tert-butyl-4-hydroxy-m-tolyl)-propionate (Irganox® 245); 3,5-di-tert-butyl-4-hydroxytoluene (Lowinox BHT, Chemtura) and so forth. In one embodiment, for instance, the antioxidant comprises pentaerythrityl tetrakis[3-(3,5-di-tert-butyl-4-hydroxyphenyl)propionate, pentaerythritol tetrakis (B-laurylthiopropionate), or a mixture thereof. Some examples of suitable sterically hindered phenolic antioxidants for use in the present composition are triazine antioxidants. Commercially available examples of such triazine-based antioxidants may be obtained from American Cyanamid under the designation Cyanox® 1790 (wherein each R group is represented by the Formula III) and from Ciba Specialty Chemicals under the designations Irganox® 3114 (wherein each R group is represented by the Formula I) and Irganox® 3125 (wherein each R group is represented by the Formula II).

Sterically hindered phenolic antioxidants may constitute from about 0.01 wt. % to about 3 wt. %, in some embodiments from about 0.05 wt. % to about 1 wt. %, and in some embodiments from about 0.05 wt. % to about 0.1 wt. % of the entire polymer composition.

In one embodiment, the polymer composition may include a black pigment. The black pigment generally includes a plurality of carbon black particles, such as furnace black, channel black, acetylene black, lamp black, etc. The carbon black particles may have any desired shape, such as a granular, flake (scaly), etc. The average size (e.g., diameter) of the particles may, for instance, range from about 1 to about 200 nanometers, in some embodiments from about 5 to about 150 nanometers, and in some embodiments from about 10 to about 100 nanometers. It is also typically desired that the carbon black particles are relatively pure, such as containing polynuclear aromatic hydrocarbons (e.g., benzo[a]pyrene, naphthalene, etc.) in an amount of about 1 part per million ("ppm") or less, and in some embodiments about 0.5 ppm or less. For example, the black pigment may contain benzo[a]pyrene in an amount of about 10 parts per billion ("ppb") or less, and in some embodiments about 5 ppb or less.

If desired, the black pigment may include a carrier resin that can encapsulate the carbon black particles, thereby providing a variety of benefits. For example, the carrier resin can enhance the ability of the particles to be handled and incorporated into the base polymer composition. While any known carrier resin may be employed for this purpose, in particular embodiments, the carrier resin may be the same as the polymer employed in the polymer matrix of the polymer composition. If desired, the carrier resin may be pre-blended with the carbon black particles to form a pigment masterbatch, which can later be combined with the polymer. When employed, the carrier resin typically constitutes from about 50 wt. % to about 95 wt. %, in some embodiments from about 60 wt. % to about 90 wt. %, and in some embodiments from about 70 wt. % to about 85 wt. % of the masterbatch, and the carbon black particles typically constitute from about 5 wt. % to about 50 wt. %, in some embodiments from about 10 wt. % to about 40 wt. %, and in some embodiments from about 15 wt. % to about 30 wt. % of the masterbatch. Of course, other components may also be incorporated into the masterbatch.

II. Melt Processing

The manner in which the polymer and other optional additives are combined may vary as is known in the art. For instance, the materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the components may be fed to the same or different feeding ports of a twin-screw extruder and melt blended to form a substantially homogeneous melted mixture. Melt blending may occur under high shear/pressure and heat to ensure sufficient dispersion. For example, melt processing may occur at a temperature of from about 50° C. to about 500° C., and in some embodiments, from about 100° C. to about 250° C. Likewise, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

If desired, one or more distributive and/or dispersive mixing elements may be employed within the mixing section of the melt processing unit. Suitable distributive mixers may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further increased in aggressiveness by using pins in the barrel that create a folding and reorientation of the polymer melt, such as those used in Buss Kneader extruders, Cavity Transfer mixers, and Vortex Intermeshing Pin mixers. The speed of the screw can also be controlled to improve the characteristics of the composition. For instance, the screw speed can be about 400 rpm or less, in one embodiment, such as between about 200 rpm and about 350 rpm, or between about 225 rpm and about 325 rpm. In one embodiment, the compounding conditions can be balanced so as to provide a polymer composition that exhibits improved impact and tensile properties. For example, the compounding conditions can include a screw design to provide mild, medium, or aggressive screw conditions. For example, system can have a mildly aggressive screw design in which the screw has one single melting section on the downstream half of the screw aimed towards gentle melting and distributive melt homogenization. A medium aggressive screw design can have a stronger melting section upstream from the filler feed barrel focused more on stronger dispersive elements to achieve uniform melting. Additionally, it can have another gentle mixing section downstream to mix the fillers. This section, although weaker, can still add to the shear intensity of the screw to make it stronger overall than the mildly aggressive design. A highly aggressive screw design can have the strongest shear intensity of the three. The main melting section can be composed of a long array of highly dispersive kneading blocks. The downstream mixing section can utilize a mix of distributive and intensive dispersive elements to achieve uniform dispersion of all type of fillers. The shear intensity of the highly aggressive screw design can be significantly higher than the other two designs. In one embodiment, a system can include a medium to aggressive screw design with relatively mild screw speeds (e.g., between about 200 rpm and about 300 rpm).

Regardless of the manner in which they are combined together, the polymer composition may possess a relatively low melt viscosity, which allows it to readily flow during production or molding. For instance, the composition may have a melt viscosity of about 700 Pa-s or less, in some embodiments about 500 Pa-s or less, in some embodiments about 250 Pa-s or less, in some embodiments about 200 Pa-s or less, in some embodiments from about 5 to about 150 Pa-s, in some embodiments from about 5 to about 100 Pa-s, and in some embodiments from about 10 to about 100 Pa-s, as determined at a shear rate of 1,200 seconds$^{-1}$ at a temperature of 20° C. higher than the melting temperature of the polymer. The melt viscosity may be determined in accordance with 11443:2005. Among other things, these viscosity properties can allow the composition to be readily shaped into parts having a small dimension.

Due to the relatively low melt viscosity that can be achieved in the present invention, relatively high molecular weight polymers can also be fed to the extruder with little difficulty. For example, such high molecular weight polymers may have a number average molecular weight of about 14,000 grams per mole ("g/mol") or more, in some embodiments about 15,000 g/mol or more, and in some embodiments, from about 16,000 g/mol to about 60,000 g/mol, as well as weight average molecular weight of about 35,000 g/mol or more, in some embodiments about 50,000 g/mol or more, and in some embodiments, from about 60,000 g/mol to about 90,000 g/mol, as determined using gel permeation chromatography as described below. One benefit of using such high molecular weight polymers, such as polyarylene sulfides, is that they generally may have a low chlorine content. In this regard, the resulting polymer composition may have a low chlorine content, such as about 1,200 ppm or less, in some embodiments about 1,000 ppm or less, in some embodiments from 0 to about 900 ppm, and in some embodiments, from about 1 to about 600 ppm.

In addition, the melting temperature of the polymer composition may, for instance, be about 180° C. or more, in some embodiments about 200° C., in some embodiments from about 210° C. to about 400° C., and in some embodiments from about 220° C. to about 380° C. Even at such melting temperatures, the ratio of the deflection temperature under load ("DTUL"), a measure of short term heat resistance, to the melting temperature may still remain relatively high. For example, the ratio may range from about 0.5 to about 1.00, in some embodiments from about 0.6 to about 0.95, and in some embodiments from about 0.65 to about 0.85. The specific DTUL values may, for instance, be about 200° C. or more, in some embodiments from about 200° C. to about 350° C., in some embodiments from about 210° C. to about 320° C., and in some embodiments from about 230° C. to about 290° C. Such high DTUL values can, among other things, allow the use of high speed and reliable surface mounting processes for mating the structure with other components of the electrical component.

The resulting composition (and shaped parts formed therefrom) has also been found to possess excellent mechanical properties. For example, the present inventors have discovered that the impact strength of the part can be significantly improved, which is useful when forming small parts. The part may, for instance, possess a Charpy notched impact strength of about 3 kJ/m$^2$ or more, in some embodiments about 5 kJ/m$^2$ or more, in some embodiments about 7 kJ/m$^2$ or more, in some embodiments from about 8 to about 40 kJ/m$^2$, and in some embodiments, from about 9 to about 20 kJ/m$^2$, measured at 23° C. according to ISO Test No. 179-1:2010) (technically equivalent to ASTM D256-12, Method B). Despite having a low melt viscosity and high impact strength, the present inventors have also discovered that the tensile and flexural mechanical properties are not adversely impacted. For example, the molded part may exhibit a tensile strength of from about 20 to about 500 MPa, in some embodiments from about 50 to about 300 MPa, in some embodiments from about 50 to about 150 MPa, and in some embodiments, from about 75 to about 125 MPa; a tensile break strain of about 0.5% or more, in some embodiments from about 0.6% to about 10%, in some embodiments from about 1% to about 5%, and in some embodiments from about 2% to about 4%; and/or a tensile modulus of from about 3,000 MPa to about 30,000 MPa, in some embodiments from about 4,000 MPa to about 20,000 MPa, in some embodiments from about 4,000 MPa to about 10,000 MPa, and in some embodiments from about 4,500 MPa to about 7,500 MPa. The tensile properties may be determined in accordance with ISO Test No. 527:2012 (technically equivalent to ASTM D638-14) at 23° C. The part may also exhibit a flexural strength of from about 20 to about 500 MPa, in some embodiments from about 50 to about 300 MPa, in some embodiments from about 70 to about 250 MPa, and in some embodiments from about 100 MPa to about 200 MPa; a flexural break strain of about 0.5% or more, in some embodiments from about 0.6% to about 10%, in some embodiments from about 1% to about 5%, and in some embodiments from about 2% to about 4%; and/or a flexural modulus of from about 3,000 MPa to about 30,000 MPa, in some embodiments from about 4,000 MPa to about 20,000 MPa, in some embodiments from about 4,000 MPa to about 10,000 MPa, and in some embodiments from about 4,500 MPa to about 7,500 MPa. The flexural properties may be determined in accordance with ISO Test No. 178:2010 (technically equivalent to ASTM D790-10) at 23° C.

Also, the polymer composition may have a relatively low density. For example, the density may be about 2.5 g/cm$^3$ or less, in some embodiments from about 0.1 g/cm$^3$ to about 2 g/cm$^3$, and in some embodiments from about 0.5 g/cm$^3$ to about 1.6 g/cm$^3$. The density may be determined in accordance with ISO 1183.

III. Antenna Covers

As indicated herein, the polymer composition can be utilized in an antenna cover. For instance, one application is antenna covers including windows including the polymer composition as defined herein, which may be a radio frequency-transparent material. The antenna covers can be fabricated using a variety of suitable manufacturing or molding techniques. Various molding techniques may be employed, such as injection molding, compression molding, nanomolding, overmolding, etc. Regardless of the molding technique employed, it has been discovered that the polymer composition of the present invention, which may possess the unique combination of high flowability and good mechanical properties, is particularly well suited for thin molded parts. For example, the part may have a thickness of about 100 millimeters or less, in some embodiments about 50 millimeters or less, in some embodiments from about 100 micrometers to about 10 millimeters, and in some embodiments, from about 200 micrometers to about 1 millimeter.

In one particular embodiment, nanomolding may be utilized for integrating a layer formed from the polymer composition with or to a first layer, such as a metal layer or conductive layer. For example, the window(s) of the antenna covers can be formed over a metal shielding layer and/or frame using nanomolding for depositing the polymer composition on the first layer. In some embodiments, the first layer may contain any of a variety of different metals, such as aluminum, stainless steel, magnesium, nickel, chromium, copper, titanium, and alloys thereof. In one particular embodiment, the first layer may include aluminum and/or aluminum alloy and in particular aluminum.

Due to its unique properties, the polymer composition can adhere to the first layer. To improve adhesion, the first layer may optionally be pretreated, such as prior to nanomolding, to increase the degree of surface indentations and surface area. For example, nanomolding can include processes including forming nanoscale features (e.g., dimples, scoring, etc.) to achieve a specific surface roughness on a metallic or conductive surface or layer, which can act as the shielding layer. This may be accomplished using mechanical surface treatments (e.g., sandblasting, grinding, flaring, punching, molding, etc.) and/or chemical surface treatments (e.g., etching, anodic oxidation, etc.). For instance, techniques for anodically oxidizing a metal surface are described in more detail in U.S. Pat. No. 7,989,079 to Lee, et al. Regardless, the resulting surface roughness is not necessarily limited by the present invention. Nevertheless, the resulting surface roughness can be about 0.1 nm or more, such as about 3 nm or more, such as about 10 nm or more. For instance, the surface roughness can range from about 1 nm to about 500 nm, in some embodiments from about 5 nm to about 300 nm, in some embodiments from about 10 nm to about 200 nm, and in some embodiments from about 20 nm to about 100 nm.

When pre-treated, such process may also remove unwanted contaminates, such as oxide layers, corrosion, oil, and the like. A second pre-treatment step can optionally include rinsing the layer with an organic solvent, water, or the like. Example organic solvents include acetone, methanol, ethanol, and benzene. As one example of a pre-treatment process, a first etching step can include dipping the first layer, such as a first conductive layer, in a basic aqueous solution (pH>7) to finely etch the surface. Examples of etchants can include alkali metal hydroxides, such as sodium hydroxide (NaOH), potassium hydroxide (KOH) and soda ash ($Na_2CO_3$). It is also possible to use alkali earth metal hydroxides such as Ca, Sr, Ba and Ra and a concentration of 0.1 to 10% of the alkali can be used. The first layer can be dipped in the etchant for several minutes and then rinsed (e.g., in water). The desired surface roughness can be achieved at the stage. A further acid treatment step can include dipping the layer in an acid aqueous solution and rinsing with water. This step can neutralize the etchant from the previous step.

In addition to pretreating the surface, the first layer may also be preheated at a temperature close to, but below the melt temperature of the polymer composition. This may be accomplished using a variety of techniques, such as contact heating, radiant gas heating, infrared heating, convection or forced convection air heating, induction heating, microwave heating or combinations thereof.

In any event, the polymer composition is generally injected into a mold that contains the optionally preheated first layer for forming the "windows" for the antenna covers. Once formed into the desired shape, the composite including the first layer, such as a metal layer or conductive layer, and the second layer formed from the polymer composition is allowed to cool so that the second layer formed from the polymer composition becomes firmly adhered to the first layer. The ability of the polymer composition to remain adhered to the first layer may be characterized by the bond strength, which may be about 5 MPa or more, in some embodiments about 10 MPa or more, in some embodiments about 15 MPa or more, in some embodiments from about 10 to about 80 MPa, in some embodiments from about 10 to about 50 MPa, in some embodiments from about 10 to about 35 MPa, and in some embodiments from about 15 to about 30 MPa.

The antenna covers disclosed herein may find particular application with 5G applications. As used herein, "5G" generally refers to high speed data communication over radio frequency signals. 5G networks and systems are capable of communicating data at much faster rates than previous generations of data communication standards (e.g., "4G, "LTE"). Various standards and specifications have been released quantifying the requirements of 5G communications. As one example, the International Telecommunications Union (ITU) released the International Mobile Telecommunications-2020 ("IMT-2020") standard in 2015. The IMT-2020 standard specifies various data transmission criteria (e.g., downlink and uplink data rate, latency, etc.) for 5G. The IMT-2020 Standard defines uplink and downlink peak data rates as the minimum data rates for uploading and downloading data that a 5G system must support. The IMT-2020 standard sets the downlink peak data rate requirement as 20 Gbit/s and the uplink peak data rate as 10 Gbit/s.

As another example, $3^{rd}$ Generation Partnership Project (3GPP) recently released new standards for 5G, referred to as "5G NR." 3GPP published "Release 15" in 2018 defining "Phase 1" for standardization of 5G NR. 3GPP defines 5G frequency bands generally as "Frequency Range 1" (FR1) including sub-6 GHz frequencies and "Frequency Range 2" (FR2) as frequency bands ranging from 20-60 GHz. However, as used herein "5G frequencies" can refer to systems utilizing frequencies greater than 60 GHz, for example ranging up to 80 GHz, up to 150 GHz, and up to 300 GHz. As used herein, "5G frequencies" can refer to frequencies that are about 2.5 GHz or higher, in some embodiments about 3.0 GHz or higher, in some embodiments from about 3 GHz to about 300 GHz, or higher, in some embodiments from about 4 GHz to about 80 GHz, in some embodiments from about 5 GHz to about 80 GHz, in some embodiments from about 20 GHz to about 80 GHz, and in some embodiments from about 28 GHz to about 60 GHz.

Antenna covers described herein can be used in antenna elements/arrays and systems that can satisfy or qualify as "5G" under standards released by 3GPP, such as Release 15 (2018), and/or the IMT-2020 Standard. To achieve such high speed data communication at high frequencies, antenna elements and arrays generally employ small feature sizes/spacing (e.g., fine pitch technology) and/or advanced materials that can improve antenna performance. For example, the feature size (spacing between antenna elements, width of antenna elements) etc. is generally dependent on the wavelength ("λ") of the desired transmission and/or reception radio frequency propagating through the substrate dielectric on which the antenna element is formed (e.g., nλ/4 where n is an integer). Further, beamforming and/or beam steering can be employed to facilitate receiving and transmitting across multiple frequency ranges or channels (e.g., MIMO, massive MIMO).

As indicated, the antenna covers may find particular application with 5G radio frequency systems. 5G radio frequency systems can include base stations, repeaters (e.g., "femtocells"), relay stations, terminals, user devices, and/or other suitable components. Referring to FIG. 1, a 5G antenna system 100 can include a base station 102, one or more relay stations 104, one or more user computing devices 106, one or more Wi-Fi repeaters 108 (e.g., "femtocells"), and/or other suitable antenna components for the 5G antenna system 100. The relay stations 104 can be configured to facilitate communication with the base station 102 by the user computing devices 106 and/or other relay stations 104 by relaying or "repeating" signals between the base station 102 and the user computing devices 106 and/or relay stations 104. The base station 102 can include a MIMO antenna array 110 configured to receive and/or transmit radio frequency signals 112 with the relay station(s) 104, Wi-Fi repeaters 108, and/or directly with the user computing device(s) 106. The user computing device 306 is not necessarily limited by the present invention and include devices such as 5G smartphones.

The MIMO antenna array 110 can employ beam steering to focus or direct radio frequency signals 112 with respect to the relay stations 104. For example, the MIMO antenna array 110 can be configured to adjust an elevation angle 114 with respect to an X-Y plane and/or a heading angle 116 defined in the Z-Y plane and with respect to the Z direction.

Similarly, one or more of the relay stations 104, user computing devices 106, Wi-Fi repeaters 108 can employ beam steering to improve reception and/or transmission ability with respect to MIMO antenna array 110 by directionally tuning sensitivity and/or power transmission of the device 104, 106, 108 with respect to the MIMO antenna array 110 of the base station 102 (e.g., by adjusting one or both of a relative elevation angle and/or relative azimuth angle of the respective devices).

FIGS. 2A and 2B illustrate a top-down and side elevation view, respectively, of an example user computing device 106. The user computing device 106 may include one or more antenna elements 200, 202 (e.g., arranged as respective antenna arrays). Referring to FIG. 2A, the antenna elements 200, 202 can be configured to perform beam steering in the X-Y plane (as illustrated by arrows 204, 206 and corresponding with a relative azimuth angle). Referring to FIG. 2B, the antenna elements 200, 202 can be configured to perform beam steering in the Z-Y plane (as illustrated by arrows 204, 206 and corresponding with a relative.

Figure 3:
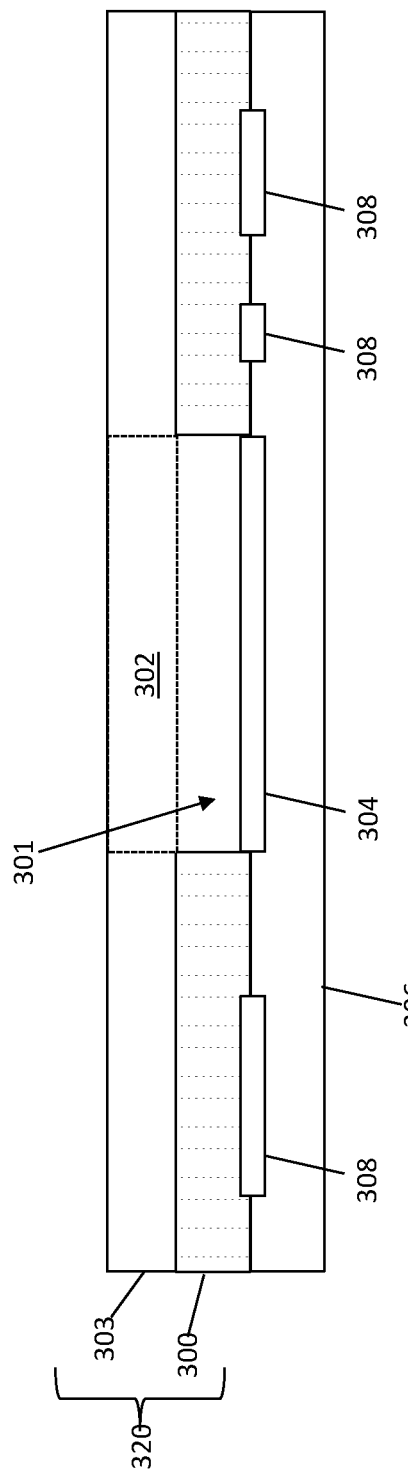
FIG. 3 depicts a side elevation view of an antenna cover having a window of a polymer composition for an antenna and a layer, such as a conductive layer, for providing shielding for other electronic components that are formed on the substrate.

FIG. 3 depicts a side elevation view of an antenna cover 320 including a first layer 300, such as a conductive layer, that provides shielding for electronic components that are formed on a substrate 306. The first layer 300 can be or include a variety of suitable materials, such as various metals or conductive polymeric materials. Example metals include aluminum, gold, nickel, tin, copper and alloys thereof.

The antenna cover 320 can include a second layer 303 formed from a polymer composition as defined herein over the first layer 300. The first layer 300 can define one or more openings 301 such that the second layer 303 is formed over (or partially received within) the opening 301 in the first layer 300 to form the "window" 302 (e.g., illustrated as a portion of the second layer 303 bounded by dotted lines). In some embodiments, when depositing the second layer 303 on the first layer 300, the second layer 303 can be partially or completely deposited within the opening 301. In other embodiments, depending on the processes used to deposit and/or form the second layer 303, the second layer 303 can be formed over and "bridge" the opening 301 without being received within the opening.

The window 302 can be at least partially aligned with one or more antenna elements 304 that are formed on a substrate 306 such that radio frequency signals can be transmitted and/or received through the "window" 302 of antenna cover 300. For example, the antenna elements 304 can be completely contained a footprint of the window 302. As another example, the antenna elements 304 can be only partially contained within the footprint of the window 302. The polymer composition can be any suitable composition described herein.

One or more additional electronic components 308 (e.g., a front end module, memory, processors, and the like) can be communicatively coupled to one or more of the antenna elements 304. The additional electronic component(s) 308 can be shielded by the first layer 300. For example, such additional electronic components 308 can be mounted on a surface of the substrate 306 and can be spaced apart from the window 302 such that the first layer 300 acts to shield the electronic components 308.

In some embodiments, the antenna cover 320 can be arranged relative to the substrate 306 such that the first layer 300 is between the substrate 306 and the second layer 303 (for example as illustrated in FIG. 3). One or more insulating layers can be formed between the first layer 300 and the substrate 306 and/or additional electronic components 308, for example to prevent the first layer 300 from causing shorting between the additional electronic components 308.

In other embodiments, however, the antenna cover 320 can be arranged relative to the substrate 306 such that the second layer 303 is between the substrate 306 and the first layer 300.

FIGS. 4A through 4C illustrate a simplified schematic side elevation view of a base station 400, a first side elevation view of an example MIMO antenna array 402, and a second side elevation view of the MIMO antenna array 402, respectively, according to aspects of the present disclosure. The base station 400 of FIG. 4A may generally correspond with the base station 102 of FIG. 1. The base station 400 may include a supporting structure 404 such as a tower, building, parking structure, or other suitable supporting structure. One or more MIMO antenna arrays 402 can be supported by the supporting structure 404. The MIMO antenna arrays 402 can be arranged in a variety of suitable configurations, (e.g., equally spaced apart around a circular perimeter, focused in a particular direction, etc.).

FIG. 4B is a simplified view of the example MIMO antenna array 402. The MIMO antenna array 402 can include a plurality of antenna elements 406. The MIMO antenna array(s) 402 can be used to provide massive MIMO functionality. More specifically, radiofrequency interactions between the various elements 406 can be controlled or tuned to provide multiple transmitting and/or receiving channels. Transmitting power and/or receiving sensitivity can be directionally controlled to focus or direct radiofrequency signals, for example as described with respect to the radiofrequency signals 112 of FIG. 1.

As one example, the antenna elements 406 can have respective widths "w", lengths "l", and spacing distances "S1" and "S2" therebetween (e.g., in the X-direction and Y-direction, respectively). These dimensions can be selected to achieve 5G radiofrequency communication at a desired 5G frequency. More specifically, the dimensions can be selected to tune the antenna array 402 for transmission and/or reception of data using radiofrequency signals that are within the 5G frequency spectrum (e.g., greater the 3 GHz and/or greater than 28 GHz.) The dimensions can be selected based on the material properties of the substrate.

For example, one or more of "w", "l", "S1," or "S2" can correspond with a multiple of a propagation wavelength ("λ") of the desired frequency through the substrate material (e.g., nλ/4 where n is an integer).

As one example, λ can be calculated as follows:

$$\lambda = \frac{c}{f\sqrt{\epsilon_R}}$$

where c is the speed of light in a vacuum, $\epsilon_R$ is the dielectric constant of the substrate (or surrounding material), f is the desired frequency.

FIG. 4C depicts a second side elevation view of the MIMO antenna array 402. The antenna elements 406 can be mounted or coupled to a base or substrate 408. An antenna cover 410 can be formed over or positioned over the substrate 408 and/or antenna elements 406. In some embodiments, the antenna cover 410 can include one or more "windows" of a radiofrequency transparent polymer composition at least partially aligned with respective antenna elements 406, for example as above with reference to FIG. 3. In other embodiments, however, the antenna cover 410 can be free of "windows" and instead include a layer of the polymer composition that is unobstructed by other materials.

It should be understood that the antenna cover described herein can include any suitable structure for covering, enclosing, protecting, or otherwise providing a physical barrier with respect to one or more antenna elements. As used herein, a "layer" of polymer composition can refer to a generally planar and thin structure. However, the "layer" can also be formed as an enclosure, housing or the like. As such, the "layer" of polymer composition of the antenna cover can have a variety of shapes. For instance, the "layer" of polymer composition of the antenna cover can be shaped (e.g., curved) to form an enclosure or housing a MIMO antenna array (e.g., in a base station).

Test Methods

Tensile Strength, Modulus, Elongation at Break: Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Strength, Modulus, Elongation at Break: Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Charpy Notched Impact Strength: Charpy notched impact strength may be tested according to ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature may be 23° C.

Dielectric Constant ("Dk") and Dissipation Factor ("Df"): The dielectric constant (or relative static permittivity) and dissipation factor are determined using a known split-post dielectric resonator technique. The technique utilized is as set forth in IEC 60250. Samples have a size of 80 mm×80 mm×1 mm and five (5) samples are tested and the average value is recorded.

Adhesion Testing: The ability of a molded part to adhere to a metal component may be determined by testing the tensile shear strength of a sample. Test specimens may be prepared by an injection molding process utilizing a three plate mold with specific cavity structures. Pre-treated aluminum metal inserts are embedded in the mold and molten plastic is then injected into the cavities and adhered to the metal parts. As the plastic cools down in the mold, the integrated parts are released from the mold. All specimens are conditioned before testing. Injection molding may be performed on a FANUC Roboshot s-2000i 100B. Barrel temperature may be set to ensure that the plastic melt temperature is around 320° C. The mold temperature may be 140° C., the screw speed may be 50 rpm, the injection speed may be 150 mm/s, and the hold pressure may be 1,000 bar. The test sample may have a length of 80 mm, thickness of 10 mm, and width of 4 mm. The testing temperature may be 23° C., and the maximum testing speed may be 50 mm/min. The test may be performed in accordance with ISO Test No. 19095-2015 using an INSTRON™ 5969 dual column tensile tester. The tensile shear strength is recorded as the maximum force that is reached before breaking the specimen.

EXAMPLES

The following examples were conducted in order to demonstrate some of the advantages and benefits of polymer compositions made according to the present disclosure.

Example 1

Samples including polybutylene terephthalate were formulated according to Table 1.

TABLE 1

| Ingredient | Sample (wt. %) | | | | |
| --- | --- | --- | --- | --- | --- |
| | A | B | C | D | E |
| Polybutylene terephthalate | 74.5 | 64.5 | 54.5 | 54.5 | 36.3 |
| Polyethylene terephthalate | 0 | 0 | 0 | 0 | 18.2 |
| Glass fibers ($D_k$ at 1 GHz - 4.5) | 20 | 20 | 20 | 20 | 20 |
| Copolymer of ethylene and glycidyl methacrylate | 5 | 5 | 5 | 5 | 0 |
| Copolymer of poly(ethylene-octene) and glycidyl methacrylate | 0 | 0 | 0 | 0 | 5 |
| Pentaerythritol tetrakis [3-[3,5-di-tert-butyl-4-hydroxyphenyl]] propionate | 0.25 | 0.25 | 0.25 | 0.25 | 0.25 |
| Pentaerythritol tetrakis (B-laurylthiopropionate) | 0.25 | 0.25 | 0.25 | 0.25 | 0.25 |
| UHMW-PE powder | 0 | 10 | 20 | 20 | 20 |

The ultrahigh molecular weight polyethylene particles had an average particle size ($d_{50}$) of 145 micrometers as determined according to laser scattering. The average molecular weight of the ultrahigh molecular weight polyethylene was 5,700,000 g/mol (Margolies' equation). The ultrahigh molecular weight polyethylene had a density of 0.930 g/cm$^3$ and a bulk density of 0.45 g/cm$^3$. The ultrahigh molecular weight polyethylene had a melt flow rate at 190° C. and a load of 21.6 kg of less than 0.1 g/10 min and had a viscosity number of less than 3,000 ml/g.

A 32 mm twin-screw extruder (Steer) was used with the parameters as shown in Table 2. All ingredients except for the glass fiber were added into the throat feed zone, the glass fiber was added through a middle stream feed zone. Each sample was removed in the form of a strand from a die having a 3.2 mm diameter. The resulting samples were granulated after a water cooling step.

TABLE 2

| Parameter | Sample | | | | |
|---|---|---|---|---|---|
|  | A | B | C | D | E |
| Barrel Temp. (° C.) | 250 | 250 | 250 | 270 | 277 |
| Screw Speed (RPM) | 350 | 350 | 350 | 550 | 550 |
| Output Rate (kg/hr) | 40 | 40 | 40 | 50 | 50 |

The granulates were pre-dried for 4 hours at 120° C. and then injection molded using a Fanuc Roboshot S2000i-100B injection molding machine with the parameters as shown in Table 3 to form test specimens from each sample composition.

TABLE 3

| Parameter | Sample | | | | |
|---|---|---|---|---|---|
|  | A | B | C | D | E |
| Barrel Temp. (° C.) | 260 | 260 | 260 | 260 | 260 |
| Mold Temp. (° C.) | 80 | 80 | 80 | 85 | 85 |
| Injection Speed (mm/s) | 100 | 100 | 100 | 36 | 36 |
| Holding Pressure (bar) | 700 | 700 | 700 | 770 | 825 |
| Cooling Time (s) | 20 | 20 | 20 | 20 | 20 |

Various properties of the test specimens molded from each sample composition were measured and are reported in Table 4.

TABLE 4

| Property | Sample | | | | |
|---|---|---|---|---|---|
|  | A | B | C | D | E |
| Density (kg/m$^3$) | 1.41 | 1.32 | 1.27 | — | — |
| $D_k$ (at 2 GHz) | 3.05 | 2.93 | 2.83 | 2.74 | 2.83 |
| $D_f$ (at 2 GHz) | 0.011 | 0.009 | 0.008 | 0.0059 | 0.0048 |
| Tensile Modulus (MPa) | 6200 | 5050 | 4700 | — | — |
| Tensile Strength (MPa) | 110 | 87 | 82 | 88 | 78 |
| Tensile Elongation at Break (%) | 3.3 | 4.0 | 4.3 | 3.7 | 2.7 |
| Flexural Modulus (MPa) | 6100 | 4900 | 4600 | 5029 | 5059 |
| Flexural Strength (MPa) | 170 | 129 | 117 | 133 | 126 |
| Charpy Notched Impact (kJ/m$^2$) | 12 | 9.5 | 9.9 | 13 | 9.4 |
| Bond Strength (MPa) | 28 | 27 | 26 | 12 | 19 |

Example 2

Samples including polyphenylene sulfide were formulated according to Table 5. The components listed were mixed in a Werner Pfleiderer ZSK 25 co-rotating intermeshing twin-screw extruder with a 32 mm diameter.

TABLE 5

| Chemical | Sample F (wt. %) |
|---|---|
| PPS | 71 |
| Carbon black | 0.5 |
| Flat glass fibers | 20 |
| Random terpolymer of ethylene, | 8 |

TABLE 5-continued

| Chemical | Sample F (wt. %) |
|---|---|
| acrylic ester and glycidyl methacrylate |  |
| Poly(Bisphenol A-co-epichlorohydrin), glycidyl end-capped | 0.5 |

The resulting pellets were injection molded on a Mannesmann Demag D100 NCIII injection molding machine and tested for certain physical characteristics, as provided in Table 6 below.

TABLE 6

| Property | Sample F |
|---|---|
| Melt Viscosity at 1,200 s$^{-1}$ (Pa-s) | 550 |
| Tensile Modulus (MPa) | 7,246 |
| Tensile Break Stress (MPa) | 113 |
| Tensile Break Elongation (%) | 2.4 |
| Charpy Notched Impact Strength (kJ/m$^2$) | 18 |
| Flexural Modulus (MPa) | 6,891 |
| Flexural Break Stress (MPa) | 178 |
| Tensile Shear Strength (N) | 1,818 |

In addition, the polymer formulation exhibits a dielectric constant of approximately 3.55 and a dissipation factor of about 0.0075 at 2 GHz.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the invention so further described in such appended claims.

What is claimed:

1. An antenna cover comprising a layer including a polymer composition comprising a polymer matrix containing at least one polymer having a glass transition temperature of about 50° C. or more wherein the polymer matrix constitutes from about 30 wt. % to about 90 wt. % of the polymer composition, wherein the polymer composition exhibits a dielectric constant of about 4 or less and a dissipation factor of about 0.02 or less, as determined at a frequency of 2 GHz, and wherein semi-crystalline and/or crystalline polymers are present in an amount of about 30 wt. % or more based on the total weight of the polymer matrix.

2. The antenna cover of claim 1, further comprising an additional layer defining at least one opening, and wherein the layer is arranged over the additional layer such that the additional layer is at least one of formed over or received in the at least one opening.

3. The antenna cover of claim 2, wherein the additional layer is a conductive layer.

4. The antenna cover of claim 2, wherein the additional layer contains aluminum.

5. The antenna cover of claim 1, wherein the polymer composition exhibits a dielectric constant of about 3.8 or less and a dissipation factor of about 0.01 or less, as determined at a frequency of 2 GHz.

6. The antenna cover of claim 1, wherein the polymer comprises a polyester, a polyarylene sulfide, a polyarylketone, or a mixture thereof.

7. The antenna cover of claim 1, wherein the polymer comprises a polyester comprising a polybutylene terephthalate.

8. The antenna cover of claim 7, wherein the polymer further comprises a polyethylene terephthalate.

9. The antenna cover of claim 1, wherein the polymer comprises a polyarylene sulfide comprising a polyphenylene sulfide.

10. The antenna cover of claim 1, wherein the polymer composition further comprises at least one impact modifier including an epoxy-functionalized olefin copolymer.

11. The antenna cover of claim 10, wherein the epoxy-functionalized olefin copolymer includes an epoxy-functional (meth)acrylic monomeric component.

12. The antenna cover of claim 11, wherein the epoxy-functional (meth)acrylic monomeric component is derived from glycidyl acrylate, glycidyl methacrylate, or a combination thereof.

13. The antenna cover of claim 10, wherein the epoxy-functionalized olefin copolymer contains an ethylene monomeric unit.

14. The antenna cover of claim 10, wherein the epoxy-functionalized olefin copolymer further contains an octene monomeric unit.

15. The antenna cover of claim 10, wherein the impact modifier is present in the polymer composition in an amount from about 1 wt. % to about 40 wt. %.

16. The antenna cover of claim 1, wherein the polymer composition further comprises at least one dielectric filler in an amount from about 5 wt. % to about 40 wt. %.

17. The antenna cover of claim 16, wherein the at least one dielectric filler comprises hollow glass spheres, glass flakes, or a mixture thereof.

18. The antenna cover of claim 16, wherein the at least one dielectric filler comprises a polymeric filler comprising an ultrahigh molecular weight polyethylene.

19. The antenna cover of claim 16, wherein the at least one dielectric filler comprises a polymeric filler comprising a high density polyethylene.

20. The antenna cover of claim 19, wherein the high density polyethylene particles have a $D_{50}$ value of from about 1 μm to about 300 μm.

21. The antenna cover of claim 19, wherein the high density polyethylene particles have a molecular weight of from about 1,000,000 g/mol to about 10,000,000 g/mol.

22. The antenna cover of claim 1, wherein the polymer composition further comprises a fibrous filler in an amount from about 3 wt. % to about 40 wt. %.

23. The antenna cover of claim 22, wherein the fibrous filler comprises flat glass fibers having an aspect ratio of about 1.5 to about 30.

24. The antenna cover of claim 1, wherein the polymer composition further comprises an epoxy resin.

25. The antenna cover of claim 24, wherein the epoxy resin contains at least about 1.3 epoxide groups per molecule.

26. The antenna cover of claim 24, wherein the epoxy resin has a dynamic viscosity of from about 1 centipoise to about 25 centipoise as determined in accordance with ASTM D445-15 at a temperature of 25° C., a melting point of from about 50° C. to about 120° C., or both.

27. The antenna cover of claim 24, wherein the epoxy resin is a glycidyl ether formed from an epichlorohydrin and a hydroxyl compound containing at least 1.5 aromatic hydroxyl groups.

28. The antenna cover of claim 27, wherein the hydroxyl compound is a dihydric phenol.

29. The antenna cover of claim 28, wherein the dihydric phenol is bisphenol A.

30. The antenna cover of claim 1, wherein the polymer composition has a density of less than about 2.5 kg/m³.

31. A user computing device including the antenna cover of claim 1.

32. A base station including the antenna cover of claim 1.

33. A 5G radio frequency communication device comprising:
    a substrate;
    an antenna element coupled to the substrate;
    an antenna cover arranged over the substrate, the antenna cover comprising a layer including a polymer composition; and
    a radio frequency component configured for operation at 2.5 GHz or greater;
    wherein the polymer composition comprises:
        a polymer matrix containing at least one polymer having a glass transition temperature of about 50° C. or more wherein the polymer matrix constitutes from about 30 wt. % to about 90 wt. % of the polymer composition,
        wherein the polymer composition exhibits a dielectric constant of about 4 or less and a dissipation factor of about 0.02 or less, as determined at a frequency of 2 GHz, and wherein semi-crystalline and/or crystalline polymers are present in an amount of about 30 wt. % or more based on the total weight of the polymer matrix.

34. The 5G radio frequency communication device of claim 33, wherein the antenna cover comprises an additional layer defining an opening, wherein the layer is formed on the additional layer, wherein the antenna cover is arranged over the substrate such that the antenna element is at least partially aligned with or received in the opening in the additional layer.

35. The 5G radio frequency communication device of claim 33, wherein the radio frequency component is configured for operation at greater than 3 GHz.

36. The 5G radio frequency communication device of claim 33, wherein the radio frequency component is configured for operation at greater than 28 GHz.

37. The 5G radio frequency communication device of claim 33, wherein the radio frequency component comprises at least one of a front end module or an antenna.

38. The 5G radio frequency communication device of claim 33, wherein the radio frequency component is included in at least one of a base station, a user computing device, a relay station, or a repeater.

39. A base station comprising:
- an antenna array; and
- an antenna cover arranged over the antenna array;
- wherein the antenna cover comprises a layer including a polymer composition comprising a polymer matrix containing at least one polymer having a glass transition temperature of about 50° C. or more wherein the polymer matrix constitutes from about 30 wt. % to about 90 wt. % of the polymer composition, wherein the polymer composition exhibits a dielectric constant of about 4 or less and a dissipation factor of about 0.02 or less, as determined at a frequency of 2 GHz, and wherein semi-crystalline and/or crystalline polymers are present in an amount of about 30 wt. % or more based on the total weight of the polymer matrix.

* * * * *